(12) United States Patent
Aoki et al.

(10) Patent No.: US 7,478,130 B2
(45) Date of Patent: Jan. 13, 2009

(54) MESSAGE PROCESSING APPARATUS, METHOD AND PROGRAM

(75) Inventors: Junichi Aoki, Tokyo-to (JP); Yoshiaki Kobayashi, Machida (JP); Hiroyuki Miyajima, Yamato (JP); Hideki Tai, Yamato (JP); Gaku Yamamoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 10/729,057

(22) Filed: Dec. 5, 2003

(65) Prior Publication Data

US 2004/0202165 A1 Oct. 14, 2004

(30) Foreign Application Priority Data

Dec. 6, 2002 (JP) ............................. 2002-355641

(51) Int. Cl.
*G06F 15/16* (2006.01)
(52) U.S. Cl. ..................................................... 709/206
(58) Field of Classification Search .................. 709/206
See application file for complete search history.

(56) References Cited

U.S. PATENT DOCUMENTS

| | | | | |
|---|---|---|---|---|
| 5,317,738 A | * | 5/1994 | Cochcroft et al. ........... | 718/103 |
| 6,148,324 A | * | 11/2000 | Ransom et al. ............. | 718/105 |
| 6,442,585 B1 | * | 8/2002 | Dean et al. .................. | 718/108 |
| 6,604,174 B1 | * | 8/2003 | Dean et al. .................. | 711/131 |
| 6,633,954 B1 | * | 10/2003 | Don et al. .................... | 711/114 |
| 6,665,699 B1 | * | 12/2003 | Hunter et al. ............... | 718/102 |
| 6,898,793 B1 | * | 5/2005 | Yamamoto et al. .......... | 719/317 |
| 6,996,821 B1 | * | 2/2006 | Butterworth ................ | 718/100 |
| 7,089,555 B2 | * | 8/2006 | Calvignac et al. ........... | 718/100 |
| 2002/0135611 A1 | * | 9/2002 | Deosaran et al. ............. | 345/738 |
| 2003/0037091 A1 | * | 2/2003 | Nishimura et al. .......... | 709/103 |
| 2003/0055668 A1 | * | 3/2003 | Saran et al. ..................... | 705/1 |
| 2004/0100906 A1 | * | 5/2004 | Gay ........................... | 370/235 |
| 2004/0216126 A1 | * | 10/2004 | Hiltgen ........................ | 719/311 |

OTHER PUBLICATIONS

R. Hyde. Memory Architecture. http://web.archive.org/web/20010611191315/webster.cs.ucr.edu/Page_AoA/MemArch.pdf. 2000. pp. 293-314.*
Butterworth, Henry Esmond. Batch Processing of Tasks in Data Processing Systems. Application No. 9906792.8. Filing Date Mar. 25, 1999. Published Sep. 27, 2000. GB 2 348 306 A.*
Japanese Publication No. 11-327908 published on Nov. 30, 1999.

* cited by examiner

*Primary Examiner*—Andrew Caldwell
*Assistant Examiner*—John M MacIlwinen
(74) *Attorney, Agent, or Firm*—Scully, Scott, Murphy & Presser, P.C.; Lisa M. Yamonaco

(57) ABSTRACT

A message processing apparatus and a message processing method are disclosed. The apparatus and the method performs managing process requestor search information, accepting agent activating event, determining the process requestor, setting a plurality of agents, determining process priority, determining compound process priority, and instructing an agent in cache memory.

32 Claims, 25 Drawing Sheets

| | |
|---|---|
| RUNNING | THE THREADS ARE ALLOCATED |
| IN_FILLED | THE MESSAGE IS IN THE AGENT CACHE AND ALSO IN THE MESSAGE QUEUE |
| IN_EMPTY | THE MESSAGE IS IN THE AGENT CACHE BUT THE MESSAGE QUEUE IS EMPTY |
| OUT_FILLED | THE MESSAGE IS NOT IN THE AGENT CACHE BUT IS IN THE MESSAGE QUEUE |
| OUT_EMPTY | THE MESSAGE IS NOT IN THE AGENT CACHE AND THE MESSAGE QUEUE IS EMPTY |

FIG. 22

| | |
|---|---|
| NotProcessed | REPRESENTS A STATE IN WHICH IT IS RECORDED BY THE MessageOrderRecorder AND NOT PROCESSED BY THE MessageResolver |
| DISTRIBUTING | REPRESENTS A STATE IN WHICH IT IS RECORDED BY THE MessageOrderRecorder AND CURRENTLY BEING PROCESSED BY THE MessageResolver |
| DISTRIBUTED | REPRESENTS A STATE IN WHICH IT IS RECORDED BY THE MessageOrderRecorder, COMPLETELY PROCESSED BY THE MessageResolver, AND INSERTED IN THE MESSAGE QUEUES OF ALL THE DESTINATION AGENTS |
| READY | REPRESENTS A STATE IN WHICH THE AGENT CAN PERFORM THE PROCESS. IT IS PUT IN THIS STATE EITHER WHEN IT IS ALREADY DELETED FROM THE RECORD OF THE MessageOrderRecorder OR WHEN IT IS AT THE HEAD OF THE RECORD OF THE MessageOrderRecorder. |

FIG. 26

MESSAGE PROCESSING APPARATUS, METHOD AND PROGRAM

FIELD OF THE INVENTION

The present invention relates to a message processing apparatus, a message processing method and a message processing program for processing a message applied to many requestors by using an agent, and in particular, to the message processing apparatus, message processing method and message processing program of which processing time is reduced.

BACKGROUND OF THE INVENTION

Japanese Published Unexamined Patent Application No. 11-327908 discloses an agent server. It discloses that the agent server limits the number of active agents in order to control increase in loads and notifies each member of a predetermined message by using an agent. It is incorporated herein by reference in entirety for all purposes.

The following describes problems that are to be solved by the present invention. As for a concrete example of the message processing server, there is a mail delivery server for notifying a member of acceptance of predetermined cause information. Concrete needs of such a mail delivery server will be considered here. For instance, as an expected need, the member pre-registers with a subscription table a condition for giving a notice desired by the member (ex. a notice that the IBM's stock price became P yen or higher). And if the message processing server receives a message such as fluctuations in stock prices from a client (ex. a computer provided to a predetermined securities company for receiving stock prices of enterprises online), it identifies the member whose cause is the message from the subscription table by performing a search and gives a notice to the identified member.

An agent server of the Japanese Published Unexamined Patent Application No. 11-327908 neither pre-registers with the subscription table the condition for giving a notice to each member to be notified nor searches for the member to be notified as to the message from the subscription table and delivers notice mail to the member.

The following need is also expected as to the mail delivery server. In the case where different messages arise closely and the notice mails relating to the different messages are delivered to the same member, it is desired to assign priorities to the notice mails to send the notice mails in order of priorities. For instance, a typical member to be notified wishes to receive the notice mail relating to stock price information earlier than the notice mail of other contents such as new product introduction in a predetermined field. A notice mail message processing application implemented on the server utilizes a multi-thread instead of a single thread for the sake of reducing overall processing time. Therefore, if the thread is allocated to each message and the message is inserted into a message queue related to each member, it takes longer time to insert the message having a large number of total members into the message queue for each member than to insert the message having a small number of total members therein so that of a high priority may get to the member later than that of a low priority.

In the case where gold members and normal members are included as grading of the members, it is desirable from the business point of view that the notice mail related to the same information get to the gold members earlier than to the normal members, that is, the gold members should have a higher priority than the normal members. While the gold members should have a higher priority, there is also an expected need that low-grade members should have urgent notice mail, that is, the notice mail of a high priority in terms of the contents delivered earlier than (in preference to) unhurried notice mail to high-grade members.

As another expected need, there will be the cases where, when there are a plurality of pieces of notice mail of different contents to be delivered to the same member, they must be delivered in order of acceptance of the cause information thereof. For instance, in the case where the IBM's stock price becomes P1 and then becomes P2 (P2<P1) several seconds later, the member to be notified as to the notice mail caused by both the messages must receive the notice mail related to the P1 first and then receive the notice mail related to the P2. Otherwise, the member will misunderstand it as a rise in the stock price although it is a drop in the stock price. In the case where a multi-thread message processing application is developed, the application has the processing performed by a plurality of threads in parallel. Therefore, depending on size of a throughput of each thread, the thread allocated to the later message finishes the processing earlier than the thread allocated to the earlier message so that the notice mail related to the message later time-wise may get to the member to be notified earlier than the notice mail related to the message earlier time-wise.

SUMMARY OF THE INVENTION

Thus, an aspect of the present invention is to reduce work time in a message processing apparatus, a message processing method and a message processing program for, the message applied to a process requester corresponding to an agent activating event, causing a corresponding agent to perform a predetermined process.

Another aspect of the present invention is to provide the message processing apparatus, message processing method and message processing program for controlling reading of an agent from a persistent storage to a cache memory and achieve the processing based on the priorities while reducing the overall processing time.

A further aspect of the present invention is to provide the message processing apparatus, message processing method and message processing program for ensuring that, while performing multi-thread processing, the messages applied to the process requestors are processed in order of acceptance of the agent activating events which caused them.

The message processing apparatus according to the present invention has: process requestor search information management means for managing process requestor search information for searching for an applicable process requestor as to an agent activating event; acceptance means for accepting the agent activating event; list information creation means for, based on the above described process requestor search information, creating list information on process requesters to which a message generated upon the above described agent activating event; a plurality of agents associated with the process requestors, stored in a persistent storage, readable from the persistent storage to a cache memory which is a program execution area and abandonable from the cache memory, each agent operating only when existing in the cache memory to be able to process the message in a message queue corresponding to the agent; insertion and reading means for, of the process requestors included in the above described list information, selecting a plurality of unselected ones as the process requestors to be inserted and read, inserting the above described message into the message queues related to the process requestors to be inserted and read and reading the agents related to the above described process requestors from the persistent storage to the cache memory; agent instruction means for instructing the agent related to the message queue having the message inserted therein to operate; and repetitive instruction means for, in the case where the unselected one remains among the process requestors included in the above described list information, waiting for termination of the process of all the agents in operation and instructing the above described insertion and reading means to repeat the process.

An example of a message processing apparatus according to the present invention has: the process requester search information management means for managing the process requester search information for searching for the applicable process requestor as to the agent activating event; the acceptance means for accepting the agent activating event; the list information creation means for, based on the above described process requestor search information, creating the list information on the process requestors to which the message generated due to the above described agent activating event is applied; the plurality of agents associated with the process requesters, stored in the persistent storage, readable from the persistent storage to the cache memory which is the program execution area and abandonable from the cache memory, each agent operating only when existing in the cache memory to be able to process the message in the message queue corresponding to the agent; a first message queue processing mechanism; a second message queue processing mechanism; selection means for selecting either one of the first and second message queue processing mechanisms; and the agent instruction means for, as to the agents related to the message queue having the message inserted therein, immediately instructing the agent to operate if the agent is in the cache memory, and reading the agent from the above described persistent storage to the above described cache memory and then instructing the agent to operate if the agent is not in the cache memory.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 22 is a table showing meanings of variable values of the control block;

FIG. 26 is a table explaining the processing states of a Messenger object.

DESCRIPTION OF SYMBOLS

Figure 1:
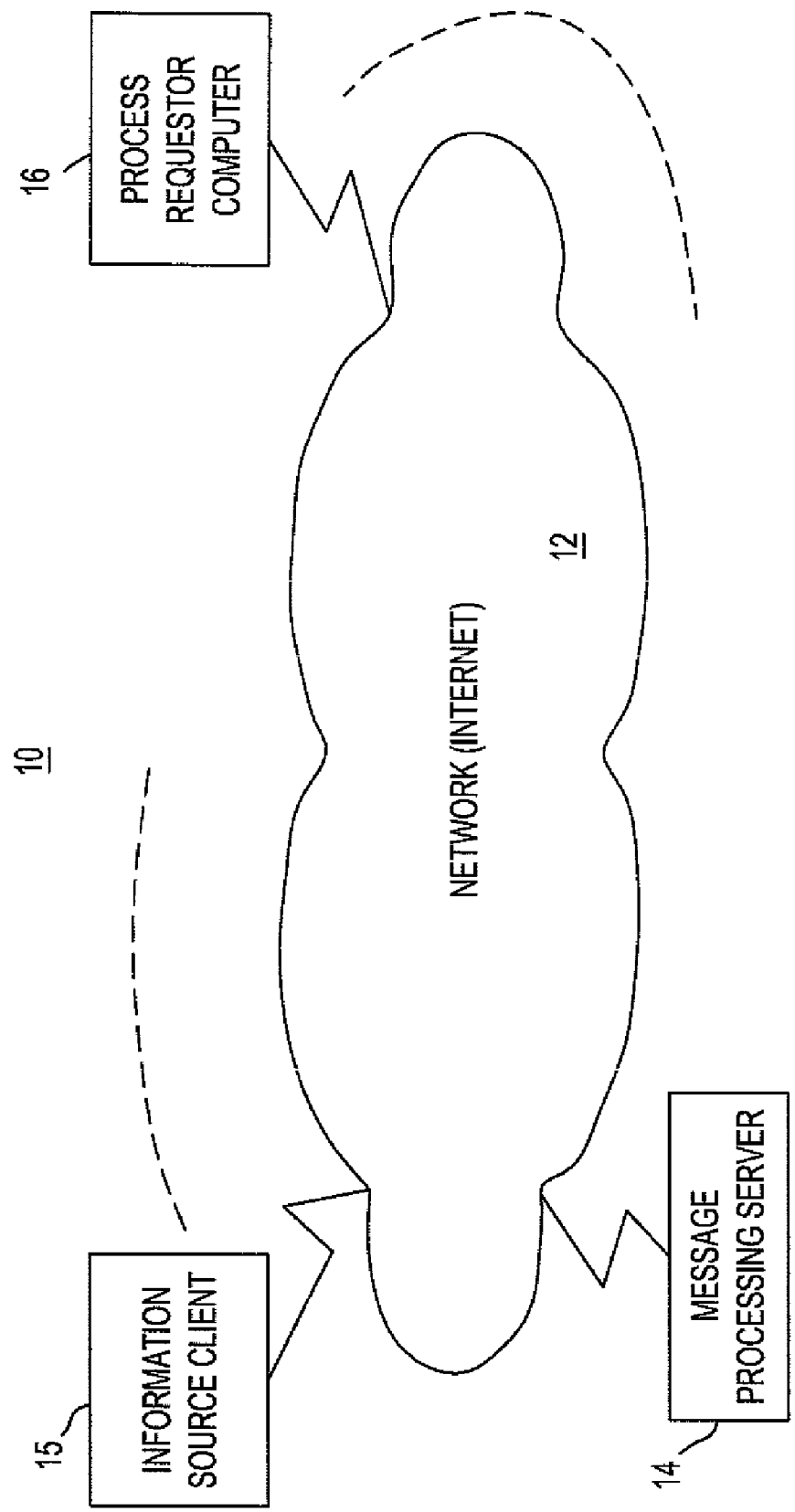
FIG. 1 is a schematic view of a message processing system.

10 . . . Message processing system
12 . . . Network
14 . . . Message processing server
15 . . . Information source client
16 . . . Process requestor computer
20 . . . Message processing apparatus
21 . . . Process requestor search information
22 . . . Process requestor search information management means
23 . . . Agent
24 . . . Persistent storage
25 . . . Cache memory
27 . . . Acceptance means
28 . . . List information creation means
31 . . . Agent instruction means
32 . . . Repetitive instruction means
34 . . . Message handler
35 . . . Data
38 . . . Insertion and reading means
39 . . . Message queue
42 . . . Message processing apparatus
43 . . . Selection means
44 . . . First message queue processing mechanism
45 . . . Second message queue processing mechanism
52 . . . Message processing apparatus
53 . . . Process requestor determination means
54 . . . Sub-process priority determination means
55 . . . Compound process priority determination means
56 . . . Agent instruction means
59 . . . Agent management means
60 . . . Existence detection means
61 . . . Grouping information management means
62 . . . Update instruction means
65 . . . Acceptance order information management means
66 . . . Allocation means 67 . . . Thread
70 . . . Proceeding information management means
72 . . . Determination means
73 . . . Agent control means

DESCRIPTION OF THE INVENTION

The present invention provides methods, systems and apparatus to reduce work time in a message processing apparatus, a message processing method and a message processing program for, as to the message applied to a process requestor corresponding to an agent activating event, causing a corresponding agent to perform a predetermined process.

The present invention also provides a message processing apparatus, message processing method and message processing program for controlling reading of an agent from a persistent storage to a cache memory and achieve the processing based on the priorities while reducing the overall processing time. The present invention further provides a message processing apparatus, message processing method and message processing program for ensuring that, while realizing the processing with the multi-thread, the messages applied to the process requestors are processed in order of acceptance of the agent activating events which caused them.

A message processing apparatus according to the present invention has: process requestor search information management means for managing process requestor search information for searching for an applicable process requestor as to an agent activating event; acceptance means for accepting the agent activating event; list information creation means for, based on the above described process requestor search information, creating list information on process requesters to which a message generated upon the above described agent activating event; a plurality of agents associated with the process requesters, stored in a persistent storage, readable from the persistent storage to a cache memory which is a program execution area and abandonable from the cache memory, each agent operating only when existing in the cache memory to be able to process the message in a message queue corresponding to the agent; insertion and reading means for, of the process requestors included in the above described list information, selecting a plurality of unselected ones as the process requesters to be inserted and read, inserting the above described message into the message queues related to the process requestors to be inserted and read and reading the agents related to the above described process requestors from the persistent storage to the cache memory; agent instruction means for instructing the agent related to the message queue having the message inserted therein to operate; and repetitive instruction means for, in the case where the unselected one remains among the process requesters included in the above described list information, waiting for termination of the process of all the agents in operation and instructing the above described insertion and reading means to repeat the process.

To operate the agents, it is necessary for the agents to exist in the cache memory. The process requesters, that is, the agents may reach several hundred thousand to several million or more for instance, and so it is difficult to have all the agents constantly existing in the cache memory in terms of a capacity of the cache memory. According to the present invention, the list information on the process requestors to which the message generated due to the agent activating event is applied is created-based on the process requestor search information, and all (when there are a small number of unselected process requestors) or several (when there are a large number of unselected process requesters) unselected process requestors remaining in the list information are selected so as to insert the message into the message queues associated with the selected process requestors. The insertion and reading means reads the agents associated with the process requesters from the persistent storage to the cache memory in parallel with or before or after the insertion work. Thus, as for the message queues having the message inserted therein, the agents associated with the message queues start operating according to an instruction from the agent instruction means such as a scheduler, where the agents to be operated have their existence in the cache memory ensured so that the reading of the agents from the persistent storage to the cache memory is controlled and the work time is reduced.

The agent activating events include a change in a stock price, a price change of a product database in a cybermall system and so on, for instance. The agents are not limited to those of the same kind of start causes, such as the agent activating events related to the IBM's stock price. For instance, the same agent may have a plurality of kinds of agent activating events as the start causes, such as having as the start causes the agent activating event as an update of a database related to prices of personal computers and the agent activating event as an update of a database related to prices of printers. The message processing apparatus according to the present invention is not limited to a mail delivery processing apparatus. The same agent may notify the process requester of the mail as to a certain agent activating event (the agent activating event is referred to as an agent activating event A1), but may not notify the process requestor of the mail as to another certain agent activating event (the agent activating event is referred to as an agent activating event A2). In addition, as to the same agent activating event (the agent activating event is referred to as an agent activating event A3), the agent activating event may have different processing results, that is, it may or may not notify the corresponding process requestor of the mail for instance, depending on a difference in one or a plurality of agent activating events which became the start causes before occurrence of the agent activating event A3 and the difference in their combinations. Moreover, the case of applying the message processing apparatus according to the present invention to an apparatus other than the mail delivery apparatus will be described in detail in a fourth embodiment described later.

The process requestor requests the message processing apparatus, message processing method and message processing program according to the present invention to perform the process from the outside. Subordinate concepts of the process requestor are members (including paid membership and free membership, and the concept of the members includes organizations such as companies in addition to individuals), process clients, application process requesters, process commissioners and server process requesters. The process requester includes a work flow processing portion for making a process request from a work flow process. It will be described in detail in a fifth embodiment described in detail later.

The agent typically includes a message handler for performing a predetermined process by using the message in the message queue as an argument and the data used by the message handler. For instance, if the message generated due to the agent activating event A is a message B, the message B is inserted into all the message queues associated with all the process requestors to which the message is applied, where each process requestor may have different processing result in the agent as to the message B according to the data in the agent. For instance, when the stock price of an enterprise 1 becomes 100 dollars from 90 dollars, process requestors 1 and 2 receive the notice mail indicating that it became 100 dollars or more, and a process requestor 3 receives the notice mail indicating that it became 95 dollars or more.

Another example of a message processing apparatus according to the present invention has: the process requester search information management means for managing the process requestor search information for searching for the applicable process requestor as to the agent activating event; the acceptance means for accepting the agent activating event; the list information creation means for, based on the above described process requestor search information, creating the list information on the process requestors to which the message generated due to the above described agent activating event is applied; the plurality of agents associated with the process requestors, stored in the persistent storage, readable from the persistent storage to the cache memory which is the program execution area and abandonable from the cache memory, each agent operating only when existing in the cache memory to be able to process the message in the message queue corresponding to the agent; a first message queue processing mechanism; a second message queue processing mechanism; selection means for selecting either one of the first and second message queue processing mechanisms; and the agent instruction means for, as to the agents related to the message queue having the message inserted therein, immediately instructing the agent to operate if the agent is in the cache memory, and reading the agent from the above described persistent storage to the above described cache memory and then instructing the agent to operate if the agent is not in the cache memory.

Furthermore, the first message queue processing mechanism has insertion means for inserting the above described message into the message queues related to all the process requesters included in the above described list information. And the second message queue processing mechanism has the insertion and reading means for, of the process requesters included in the above described list information, selecting a plurality of unselected ones as the process requestors to be inserted and read, inserting the above described message into the message queues related to the process requestors to be inserted and read and reading the agents related to the above described process requestors from the persistent storage to the cache memory, and the repetitive instruction means for, in the case where the unselected one remains among the process requesters included in the above described list information, waiting for termination of the process of all the agents in operation and instructing the above described insertion and reading means to repeat the process.

The total number of the process requesters related to the agent activating event is different as to each agent activating event. It may be a very large number or an extremely small number. The rate at which the agents associated with the process requestors are hit in the cache memory is different according to the situation. When similar agent activating events are successively accepted, the possibility that the process requestors related to each agent activating event coincide becomes higher, and so a hit rate in the cache memory rises as to the agents associated with the process requestors to which the message generated upon the agent activating event. In such cases, the work time may sometimes be reduced, (a) rather than by, of the process requesters included in the list information, selecting the unselected ones, inserting the message into all the message queues associated with the selected process requesters and reading the agents related to all the message queues to the cache memory, (b) by immediately reading the agent to be operated when the agent is in the cache memory or reading the agent from the persistent storage to the cache memory and then operating it when the agent is not therein. According to the present invention, (a) and (b) are freely selectable. (a) and (b) are switchable for each agent activating event, each day of the week, each season and each time period for instance.

A further message processing apparatus according to the present invention has: the process requestor search information management means for managing the process requestor search information for searching for the applicable process requestor as to the agent activating event; the acceptance means for accepting the agent activating event; the process requestor determination means for determining the process requestor to which the message generated due to the above described agent activating event is applied based on the above described process requestor search information; the plurality of agents associated with the process requestors, stored in the persistent storage, readable from the persistent storage to the cache memory as the program execution area and abandonable from the cache memory, each agent becoming operable when existing in the cache memory; at least one sub-process priority determination means for determining process priority about each message as sub-process priority based on a single standard of value; compound process priority determination means for, when the total number of the above described sub-process priority determination means is two or more, determining compound process priority about each message based on the sub-process priority individually determined as to each message by each sub-process priority determination means, and when the total number of the above described sub-process priority determination means is one, determining as the compound process priority the sub-process priority determined by the above described one sub-process priority determination means as to each message; and agent instruction means for rendering the message of the highest compound process priority among the messages held by each message queue as the message of the highest priority, and between the agents related to the message queues of which compound process priority of the message of the highest priority is the same, instructing the agent existing in the cache memory to operate in preference to the agent not existing therein.

There is a need for, while controlling the processing time of the entire process requestor processing apparatus, setting processing priorities as to the messages and processing the messages based on the processing priorities. The processing priorities may be determined based on a single standard of value or determined by compounding the processing priorities of a plurality of standards of value. According to the present invention, the processing is performed based on compound processing priorities, and in the case where the messages of the same highest compound processing priority are included among the message queues, the message queue having the agent associated with the message queue existing in the cache memory is processed in preference to the message queue not having it. Thus, it eliminates the situation in which the agent to be operated as to the agent activating event of this time is not operated while existing in the cache memory and its operation is put off so that its turn of delivery comes when it no longer exists in the cache memory, and the agent has to be read from the persistent storage to the cache memory.

A further message processing apparatus according to the present invention has: the process requestor search information management means for managing the process requester search information for searching for the applicable process requestor as to the agent activating event; the acceptance means for accepting the agent activating event; acceptance order information management means for managing the acceptance order information on the agent activating events accepted by the above described acceptance means; the plurality of agents associated with the process requestors, stored in the persistent storage, readable from the persistent storage to the cache memory as the program execution area and abandonable from the cache memory, each agent operating only when existing in the cache memory to be able to process the message in the message queue corresponding to the agent; a plurality of threads mutually operable in parallel, each thread detecting the process requesters to which the message generated due to the above described agent activating event is applied based on the above described process requestor search information and inserting the above described message into the message queues related to the process requesters; allocation means for allocating to each thread the agent activating event to be processed by that thread; proceeding information management means for managing proceeding information on the process by the thread as to each agent activating event accepted by the above described acceptance means; determination means for, as to the agent activating event of which process proceeding information is the information on thread process termination (hereafter, referred to as a "determined agent activating event"), determining whether or not, of the agent activating events accepted by the above described acceptance means prior to the determined agent activating event, there is any agent activating event of which thread process is unfinished; and agent control means for controlling the process by the agent as to the message generated due to the determined agent activating event determined as "yes" by the above described determination means.

The agent activating events are accepted one after another, and the number of the process requesters to which the message generated due to the agent activating event is applied is enormous. Therefore, for the sake of reducing the work time, it is desirable, as to each agent activating event, to have different threads, that is, a plurality of threads perform the process of inserting the message generated due to the agent activating event into the message queue of the process requestor related to the agent activating event. In the case of adopting a multi-thread, however, the thread for processing the agent activating event accepted later in acceptance order may finish the process earlier than the thread for processing the agent activating event accepted earlier in acceptance order depending on the total number of the process requestors to which the message generated due to each agent activating event is applied. According to the present invention, even if the process related to the agent activating event accepted later in acceptance order is finished in the process of inserting the messages into the message queues, the process to the process requesters by the agents is controlled as to the message generated due to the later agent activating event unless the process related to the agent activating event accepted earlier in acceptance order is finished.

The message processing method according to the present invention has: a process requestor search information management step of managing process requestor search information for searching for the applicable process requestor as to the agent activating event; an acceptance step of accepting the agent activating event; a list information creation step of, based on the above described process requestor search information, creating the list information on the process requesters to which the message generated due to the above described agent activating event is applied; an agent setting step of setting a plurality of agents, the agents being associated with the process requesters, stored in the persistent storage, readable from the persistent storage to the cache memory as the program execution area and abandonable from the cache memory, each agent operating only when existing in the cache memory to be able to process the message in the message queue corresponding to the agent; an insertion and reading step of, of the process requesters included in the above described list information, selecting a plurality of unselected ones as the process requesters to be inserted and read, inserting the above described message into the message queues related to the process requestors to be inserted and read, and reading the agents related to the above described process requestors from the persistent storage to the cache memory; an agent instruction step of instructing the agent related to the message queue having the message inserted therein to operate; and a repetitive instruction step of, in the case where the unselected one remains among the process requesters included in the above described list information, waiting for termination of the process of all the agents in operation and instructing the above described insertion and reading step to be repeated.

Another message processing method according to the present invention has: the process requester search information management step of managing the process requestor search information for searching for the applicable process requestor as to the agent activating event; the acceptance step of accepting the agent activating event; the list information creation step of, based on the above described process requestor search information, creating the list information on the process requestors to which the message generated due to the above described agent activating event is applied; the agent setting step of setting a plurality of agents, the agents being associated with the process requestors, stored in the persistent storage, readable from the persistent storage to the cache memory as the program execution area and abandonable from the cache memory, each agent operating only when existing in the cache memory to be able to process the message in the message queue corresponding to the agent; a first message queue processing step; a second message queue processing step; a selection step of selecting either one of the first and second message queue processing steps; and the agent instruction step of, as to the agent related to the message queue having the message inserted therein, immediately instructing the agent to operate if the agent is in the cache memory, and reading the agent from the above described persistent storage to the above described cache memory and then instructing the agent to operate if the agent is not in the cache memory.

Furthermore, the first message queue processing step has an insertion step of inserting the above described message into the message queues related to all the process requestors included in the above described list information. And the second message queue processing step has the insertion and reading step of, of the process requestors included in the above described list information, selecting a plurality of unselected ones as the process requesters to be inserted and read, inserting the above described message into the message queues related to the process requesters to be inserted and read and reading the agents related to the above described process requesters from the persistent storage to the cache memory, and the repetitive instruction step of, in the case where the unselected one remains among the process requesters included in the above described list information, waiting for termination of the process of all the agents in operation and instructing the above described insertion and reading step to be repeated.

A further message processing method according to the present invention has: the process requestor search information management step of managing the process requestor search information for searching for the applicable process requestor as to the agent activating event; the acceptance step of accepting the agent activating event; a process requester determination step of determining the process requestor to which the message generated due to the above described agent activating event is applied based on the above described process requestor search information; the agent setting step of setting a plurality of agents, the agents being associated with the process requestors, stored in the persistent storage, each agent being readable from the persistent storage to the cache memory as the program execution area and abandonable from the cache memory, and each agent operating only when existing in the cache memory to be able to process the message in the message queue corresponding to the agent; at least one sub-process priority determination step of determining a process priority about each message as a sub-process priority based on a single standard of value; a compound process priority determination step of, when the total number of the above described sub-process priority determination steps is two or more, determining a compound process priority about each message based on the sub-process priority individually determined as to each message in each sub-process priority determination step, and when the total number of the above described sub-process priority determination steps is one, determining as the compound process priority the sub-process priority determined in the above described one sub-process priority determination step as to each message; and the agent instruction step of rendering the message of the highest compound process priority among the messages held by each message queue as the message of the highest priority, and between the agents related to the message queues of which compound process priority of the message of the highest priority is the same, instructing the agent existing in the cache memory to operate in preference to the agent not existing therein.

A still further message processing method according to the present invention has: the process requester search information management step of managing the process requestor search information for searching for the applicable process requestor as to the agent activating event; the acceptance step of accepting the agent activating event; an acceptance order information management step of managing the acceptance order information on the agent activating events accepted by the above described acceptance step; the agent setting step of setting a plurality of agents, the agents being associated with the process requestors, stored in the persistent storage, readable from the persistent storage to the cache memory as the program execution area and abandonable from the cache memory, and each agent operating only when existing in the cache memory to be able to process the message in the message queue corresponding to the agent; a thread setting step of setting a plurality of threads, the threads being mutually operable in parallel, detecting the process requesters to which the message generated due to the agent activating event is applied based on the above described process requester search information and inserting the above described message into the message queues related to the process requesters; an allocation step of allocating to each thread the agent activating event to be processed by that thread; a proceeding information management step of managing the proceeding information on the process by each thread as to each agent activating event accepted by the above described acceptance step; a determination step of, as to the agent activating event of which process proceeding information is the information on thread process termination (hereafter, referred to as the "determined agent activating event"), determining whether or not, of the agent activating events accepted in the above described acceptance step prior to the determined agent activating event, there is any agent activating event of which thread process is unfinished; and an agent control step of controlling the process by the agent as to the message generated due to the determined agent activating event determined as "yes" in the above described determination step.

The message processing program according to the present invention causes a computer to execute the steps in the above described message processing methods.

Example embodiments of the present invention will be described. It goes without saying that the embodiments of the invention and subsequently described working examples do not limit the present invention thereto but are changeable in various ways to the extent of not deviating from the substance thereof FIG. 1 is a schematic view of a message processing system 10. A network 12 is the Internet in the typical cases. A message processing server 14 for implementing the applications following the present invention, a plurality of information source clients 15, and several hundred thousand to several million or more process requestor computers 16 can mutually send and receive messages, data and various kinds of information via the network 12. In the case where a predetermined portion in a work flow is the process requestor, it is possible for one computer 16 to be a plurality of mutually identifiable process requestors. The information source clients 15 are installed in securities companies and so on in order to send stock quotations as an agent activating event to the message processing server 14, for instance. The requestor computers 16 may be connected to the network 12 directly or via a router.

Figure 2:
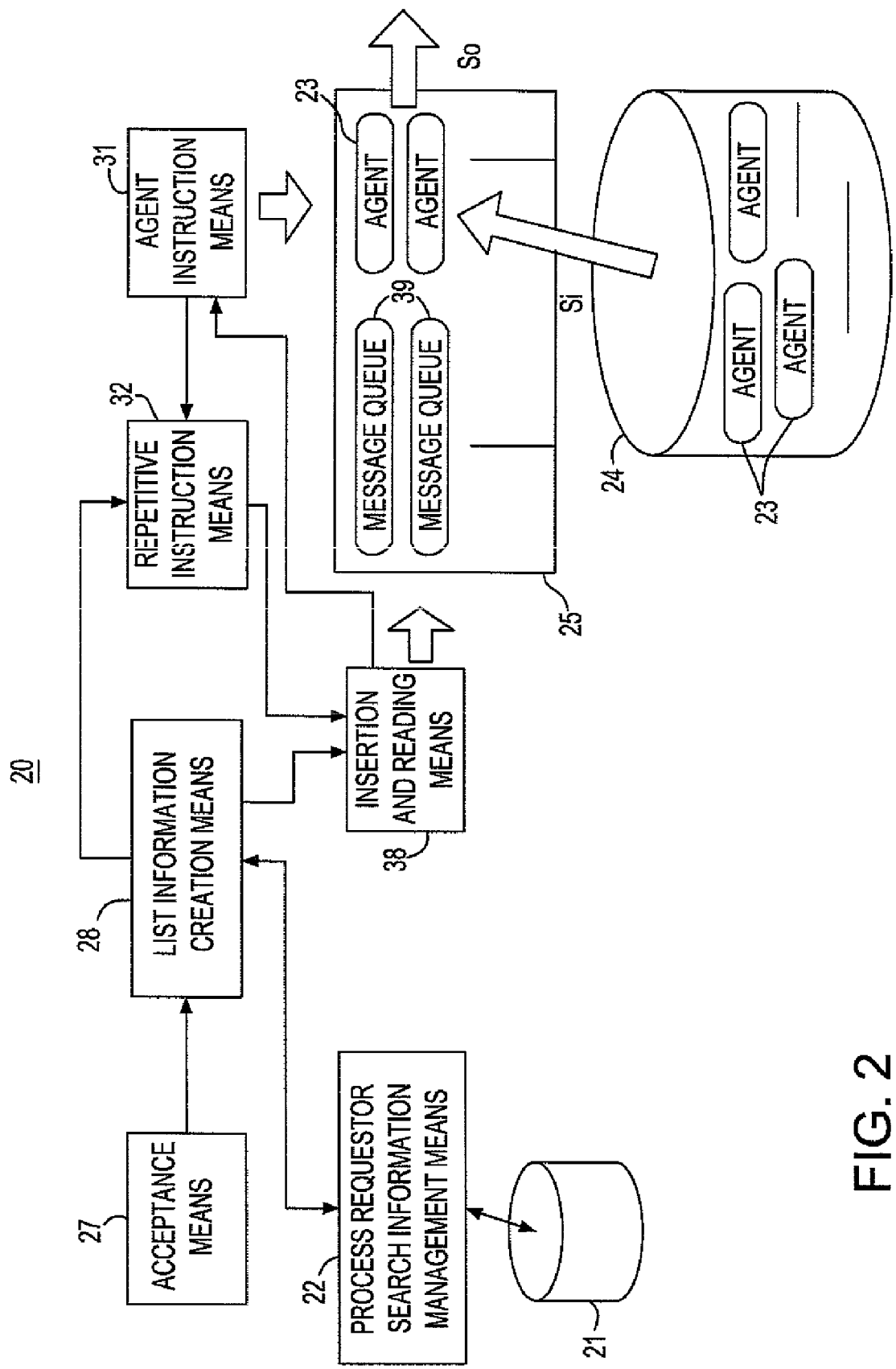
FIG. 2 is a block diagram of a message processing apparatus.

FIG. 2 is a block diagram of a message processing apparatus 20. In the message processing apparatus 20, process requestor search information management means 22 manages process requestor search information 21 for searching for an applicable process requestor as to an agent activating event. The process requester search information 21 is stored in a persistent storage such as a hard disk drive and a magnetic tape drive. Acceptance means 27 accepts the agent activating event. List information creation means 28 creates list information on process requesters to which a message generated due to the agent activating event is applied based on the process requestor search information 21. A plurality of agents 23 are associated with the process requestors, stored in a persistent storage 24, readable from the persistent storage 24 to a cache memory 25 as a program execution area and abandonable from the cache memory 25. Each agent 23 operates only when existing in the cache memory 25 to be able to process the message in a message queue corresponding to the agent 23. Insertion and reading means 38 selects a plurality of unselected ones as the process requestors to be inserted and read of the process requestors included in the list information, inserts the message into a message queue 39 related to the process requestors to be inserted and read and reads the agents 23 related to the process requestors from the persistent storage 24 to the cache memory 25. Agent instruction means 31 instructs the agents 23 related to the message queue 39 having the message inserted therein to operate. Repetitive instruction means 32 waits for termination of the process of all the agents 23 in operation and instructs the insertion and reading means 38 to repeat the process in the case where the unselected one remains among the process requesters included in the list information.

It is called "Swap In Si" to read the agents 23 from the persistent storage 24 to the cache memory 25, and as appropriate, it is called "Swap Out So" to erase it by overwriting and so on the persistent storage 24. The Swap In Si and Swap Out So are possible in the unit of one agent 23. The Swap In Si and Swap Out So are indicated by a thick arrow in FIGS. 2, 4 and so on, and indicated by thick and thin arrows in FIG. 5. The Swap In Si and Swap Out So indicated by the thick arrow means that the Swap In Si and Swap Out So are performed by putting a plurality of agents 23 together and that indicated by the thin arrow means that the Swap In Si and Swap Out So are performed with one agent 23.

In the case where the message processing apparatus 20 is used as a mail delivery apparatus for instance, each agent 23 notifies the process requestors associated with the agent 23 as to the message in the message queue 39 associated with the agent 23.

Termination of the process of the agent in the mail delivery apparatus is the end of distribution by the agent to a mail server on the process requestor side managing a mail address of that process requestor in the typical cases. However, the process becomes temporarily or persistently difficult for the agent in the case where there is a difficulty in distribution for the reason that a mail address of the process requestor which existed in the past is now erased from the mail server on the process requestor side or the distribution is not possible due to temporary trouble of the mail server. In such cases, the agent can finish the process immediately or on satisfaction of a predetermined condition and determine this termination as "termination of the process of the agent." The predetermined condition is that the difficulty in distribution is not resolved after a certain time or the distribution to the mail server on the other side failed after attempting it a predetermined number of times.

Figure 3:
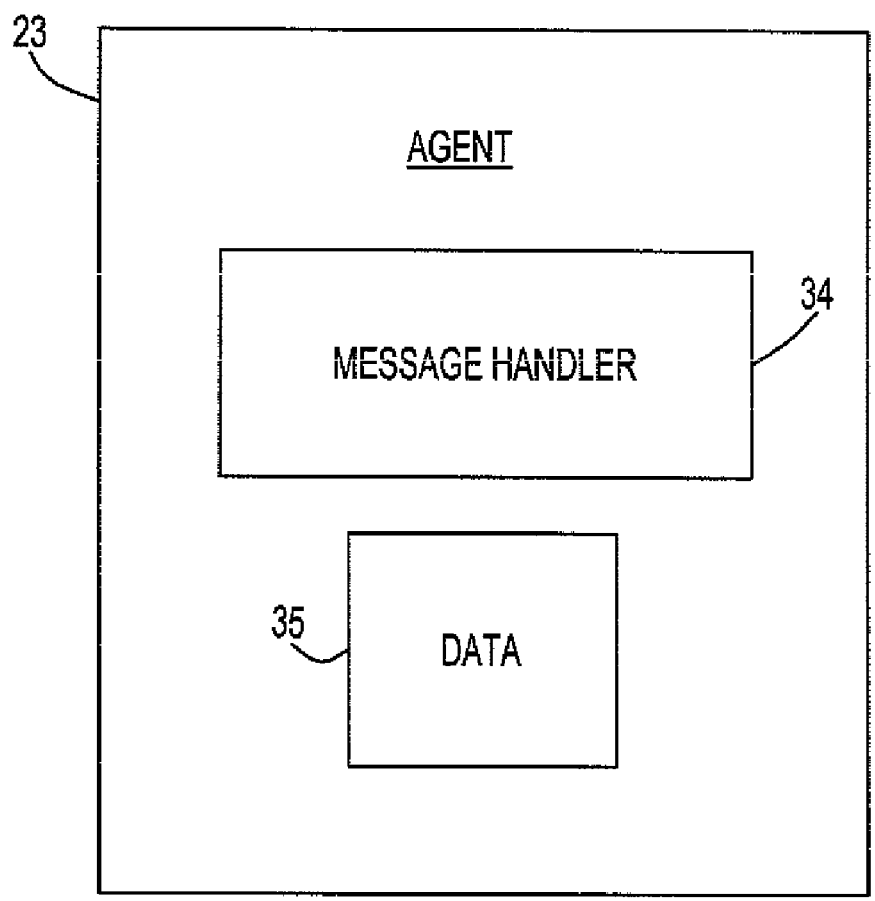
FIG. 3 is a block diagram of an agent.

FIG. 3 is a block diagram of the agent 23. The agent 23 includes a message handler 34 for having the message passed thereto as an argument and performing a predetermined process and data 35 for being used by the message handler 34 when performing that process.

Figure 4:
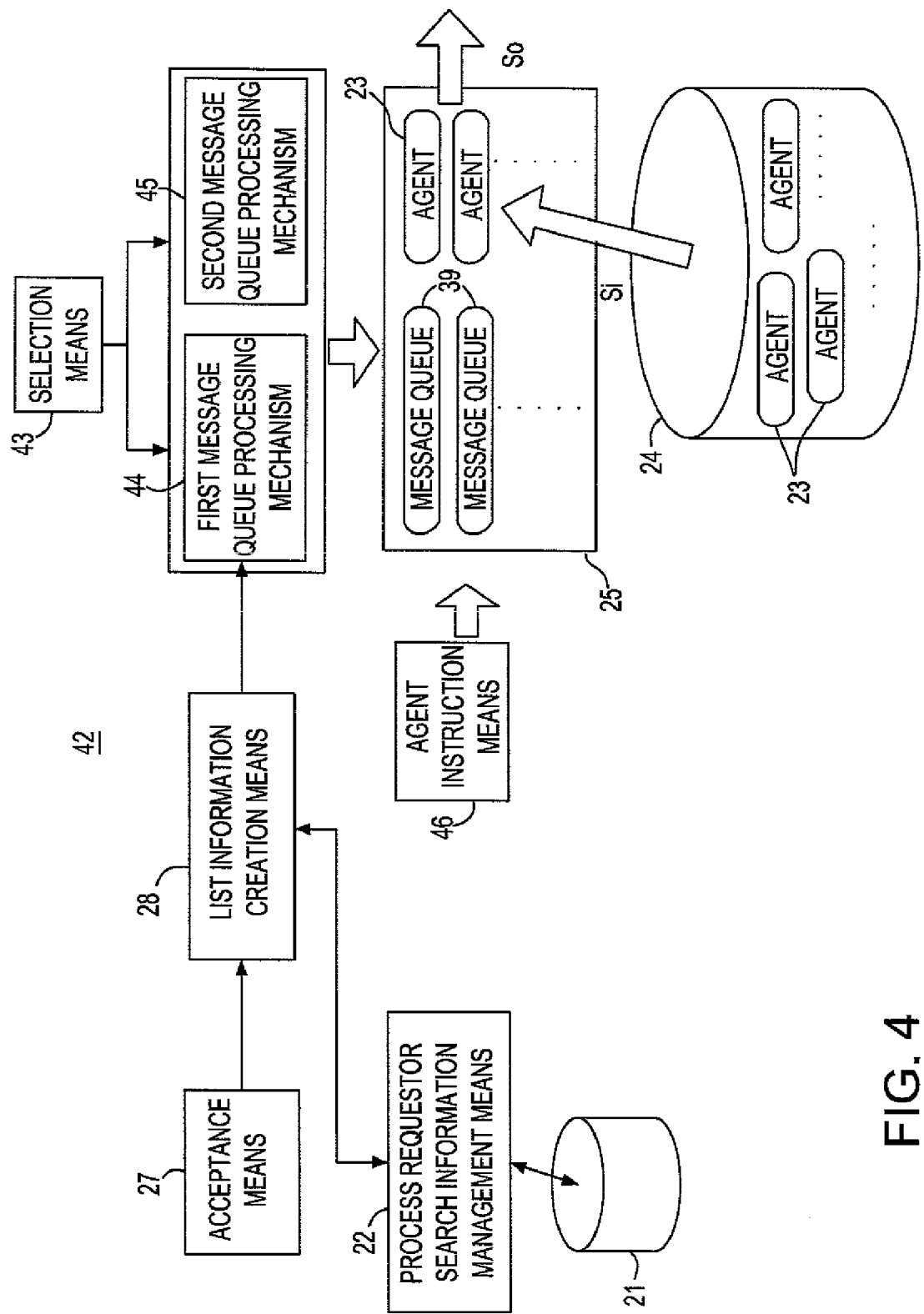
FIG. 4 is a block diagram of another message processing apparatus.

FIG. 4 is a block diagram of a message processing apparatus 42. In the message processing apparatus 42, the same elements as those of the message processing apparatus 20 in FIG. 2 are indicated by the same reference numerals, and a description thereof will be omitted. Selection means 43 selects either one of first and second message queue processing mechanisms 44 and 45. If the agent 23 related to the message queue 39 in which the message is inserted is in the cache memory 25, agent instruction means 46 immediately instructs the agent 23 to operate. And if the agent 23 is not in the cache memory 25, it reads the agent 23 from the persistent storage 24 to the cache memory 25 and then instructs the agent 23 to operate.

Figure 5:
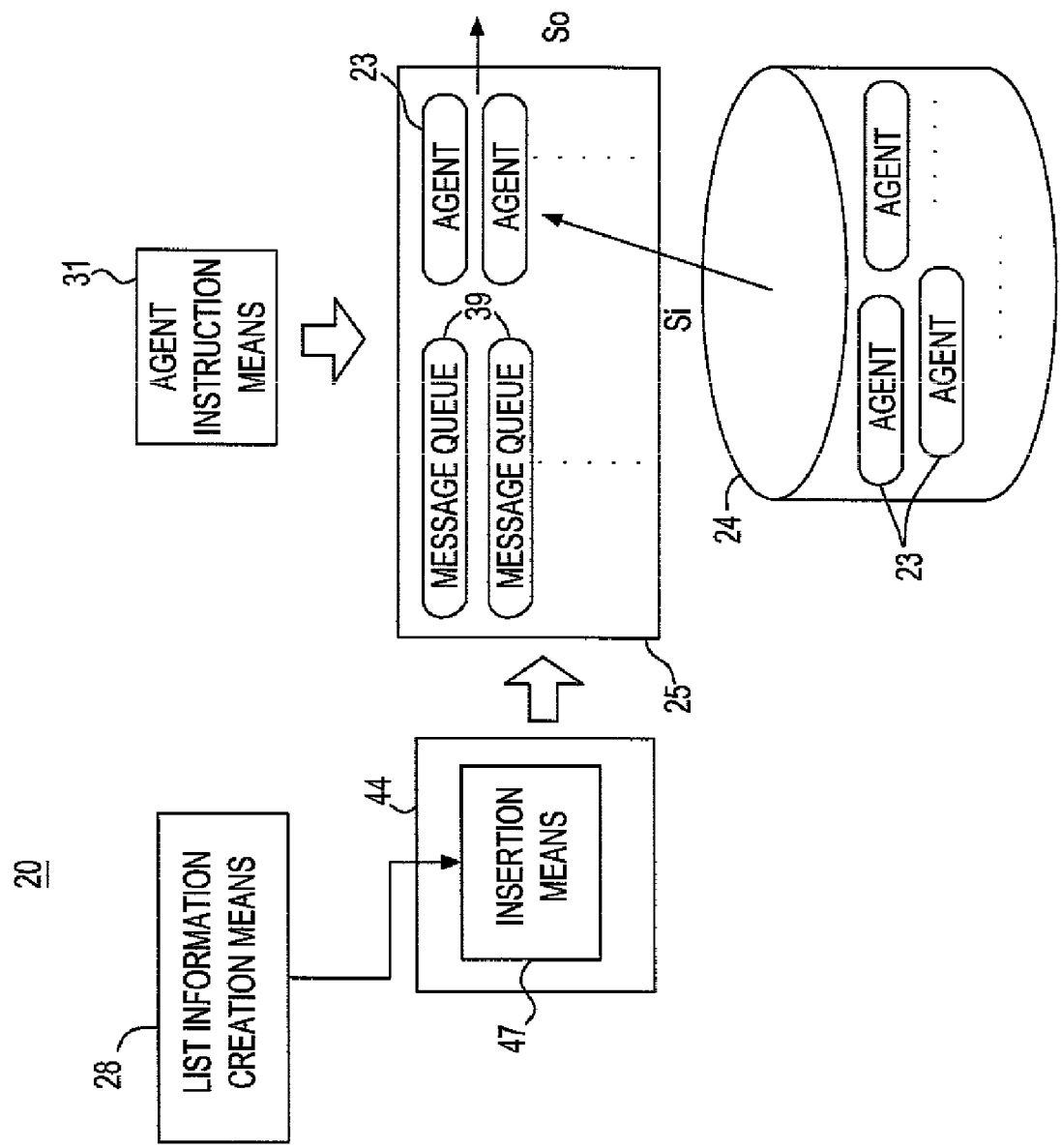
FIG. 5 is a detailed view of a first delivery control mechanism.
Figure 6:
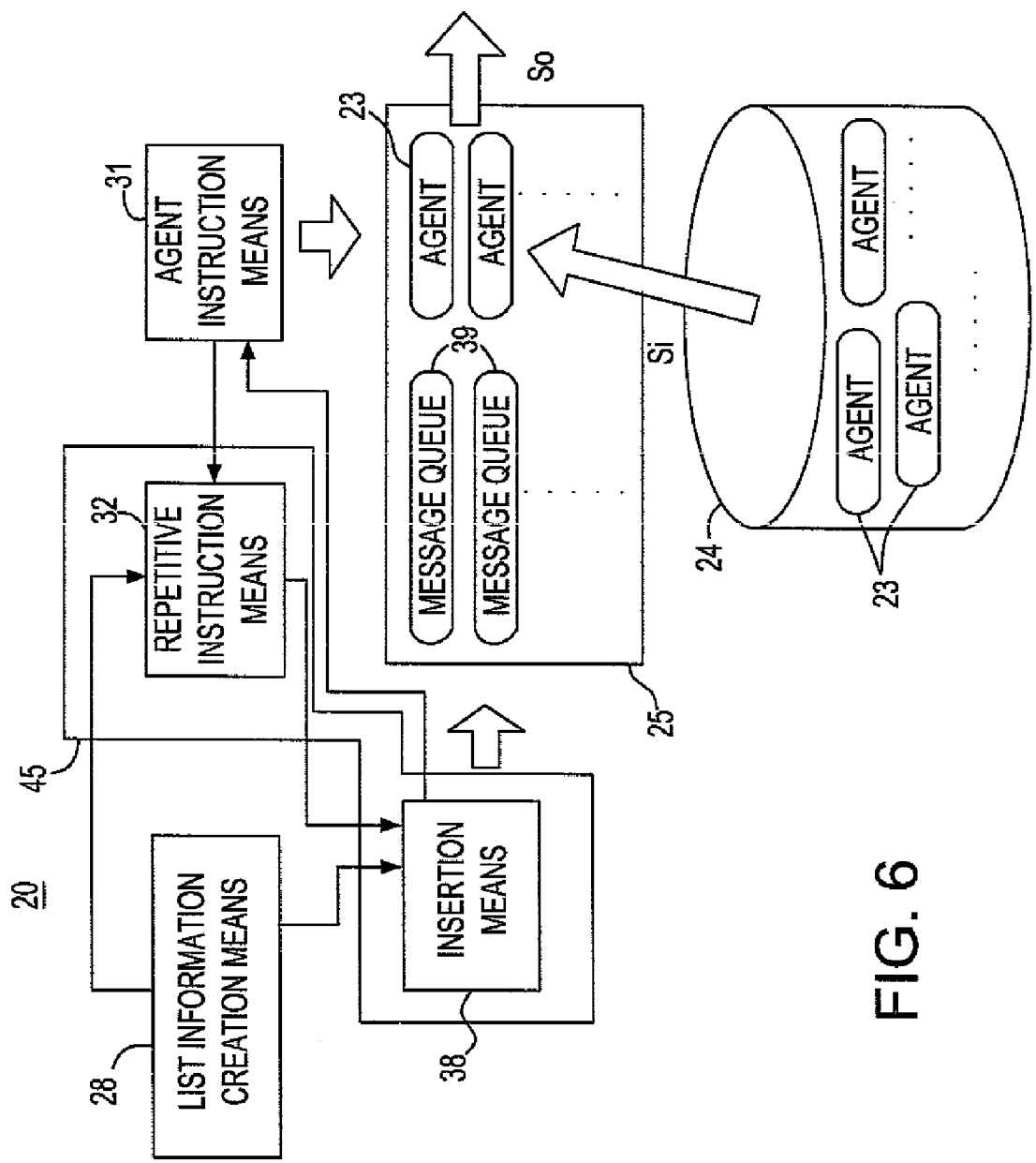
FIG. 6 is a detailed view of a second delivery control mechanism.

FIGS. 5 and 6 are detailed views of the first and second message queue processing mechanisms 44 and 45. The first message queue processing mechanism 44 inserts the message into the message queues 39 associated with all the process requestors included in the list information. The second message queue processing mechanism 45 includes the insertion and reading means 38 and repetitive instruction means 32. The insertion and reading means 38 and repetitive instruction means 32 of the second message queue processing mechanism 45 are the same as the insertion and reading means 38 and repetitive instruction means 32 of the message processing apparatus 20 in FIG. 2, and a description thereof will be omitted.

With reference to FIG. 4 again, the selection by the selection means 43 is based on an instruction of an operator. Or the selection by the selection means 43 is based on the estimated number of the process requestors to which the message generated due to the agent activating event of this time is applied, estimated hit rate in the cache memory 25 as to the agents 23 related to the process requestors to which the message generated due to the agent activating event of this time is applied, estimated work time, in the case where the selection means 43 selects the first message queue processing mechanism 44, from acceptance of the information by the acceptance means 27 until obtaining the list information on the process requestors to which the message is applied and inserting the message into the message queues 39 of all the agents 23, estimated work time, in the case where the selection means 43 selects the second message queue processing mechanism 45, from acceptance of the information by the acceptance means 27 until obtaining the list information on the process requesters to which the message is applied and inserting the message into the message queues 39 of all the agents 23, estimated time from determination of use as to the agent 23 in the cache memory 25 until completion of the process by the determined agent 23, and/or estimated time from the determination of use as to the agent 23 outside the cache memory 25 until the completion of the process by the determined agent 23.

Figure 7:
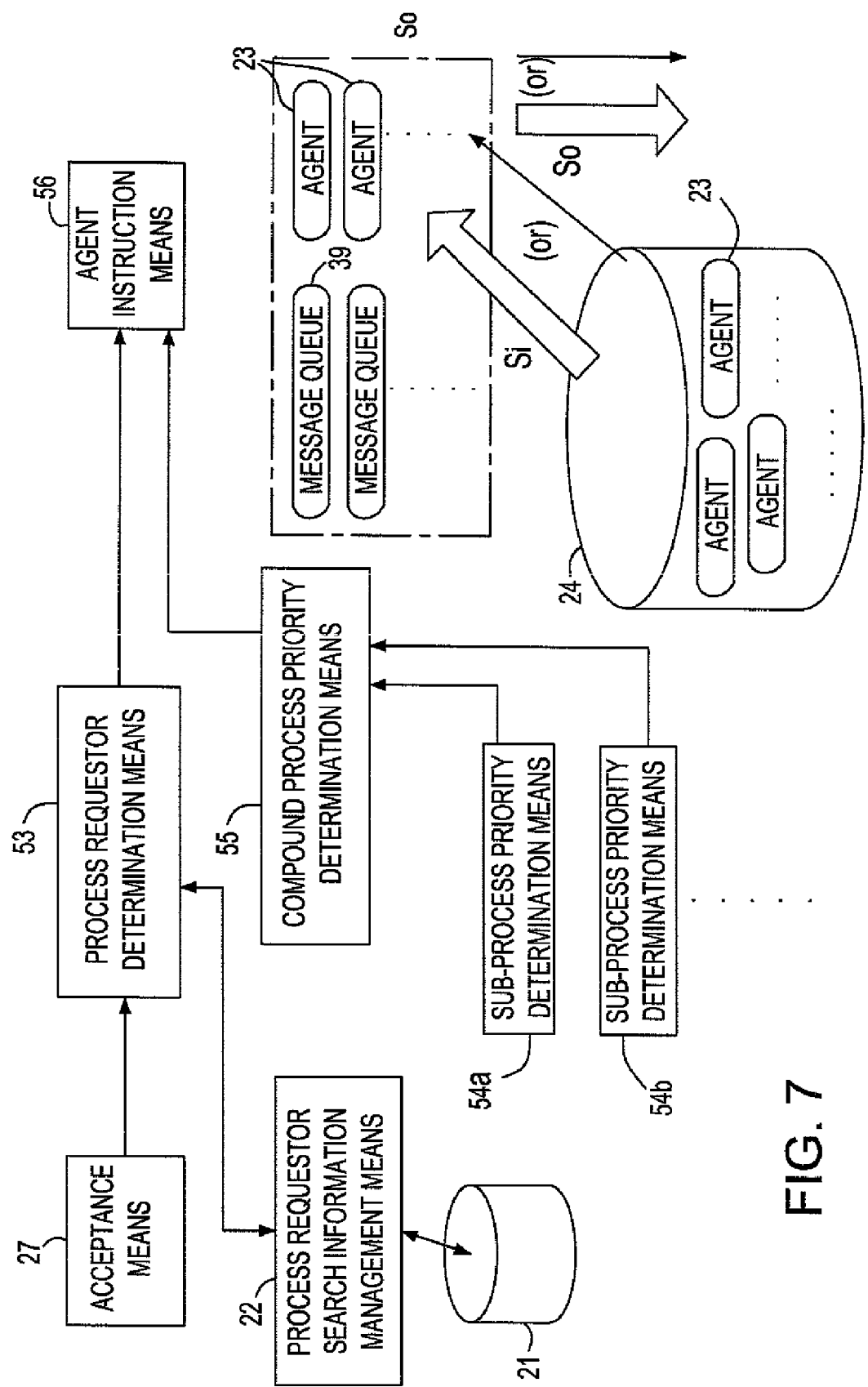
FIG. 7 is a block diagram of the message processing apparatus.

FIG. 7 is a block diagram of a message processing apparatus 52. The process requestor search information 21, process requestor search information management means 22, agents 23, persistent storage 24, cache memory 25, acceptance means 27 and message queue 39 in the message processing apparatus 52 are the same as those in the aforementioned message processing apparatus 20, and a description thereof will be omitted. Process requestor determination means 53 determines the process requestor to which the message generated due to the agent activating event is applied based on the process requestor search information 21. At least one sub-process priority determination means 54a, 54b, . . . determine a process priority about each message as sub-process priority based on a single standard of value. Compound process priority determination means 55 determines a compound process priority about each message based on the sub-process priority individually determined as to each message by each sub-process priority determination means 54a, 54b, . . . when the total number of the sub-process priority determination means 54a, 54b, . . . is two or more. And when the total number of the sub-process priority determination means is one, the compound process priority determination means 55 determines as the compound process priority the sub-process priority determined by the one sub-process priority determination means (54a for instance) as to each message. Agent instruction means 56 renders the message of the highest compound process priority among the messages held by each message queue as the message of the highest priority, and instructs the agent 23 existing in the cache memory 25 to operate in preference to the agent 23 not existing therein between the agents 23 related to the message queues of which compound process priority of the message of the highest priority is the same.

The standards of value are related either to the contents of the message or to the process requestors to which the message is applied. The standard of value related to the contents of the message includes the one related to emergency of processing of the message. The standard of value related to the process requesters to which the message is applied includes the one related to rating of the process requestors. In the case where, as the process requesters, there exist a gold process requester, a silver process requestor and a bronze process requester, they are rated in order of the gold, silver and bronze process requesters.

When there are a plurality of messages held by the message queue related to the agent 23 having started the process by the agent instruction means 46, the agent 23 continuously processes all those messages or the messages of which compound process priority is within a predetermined position in descending rank.

Figure 8:
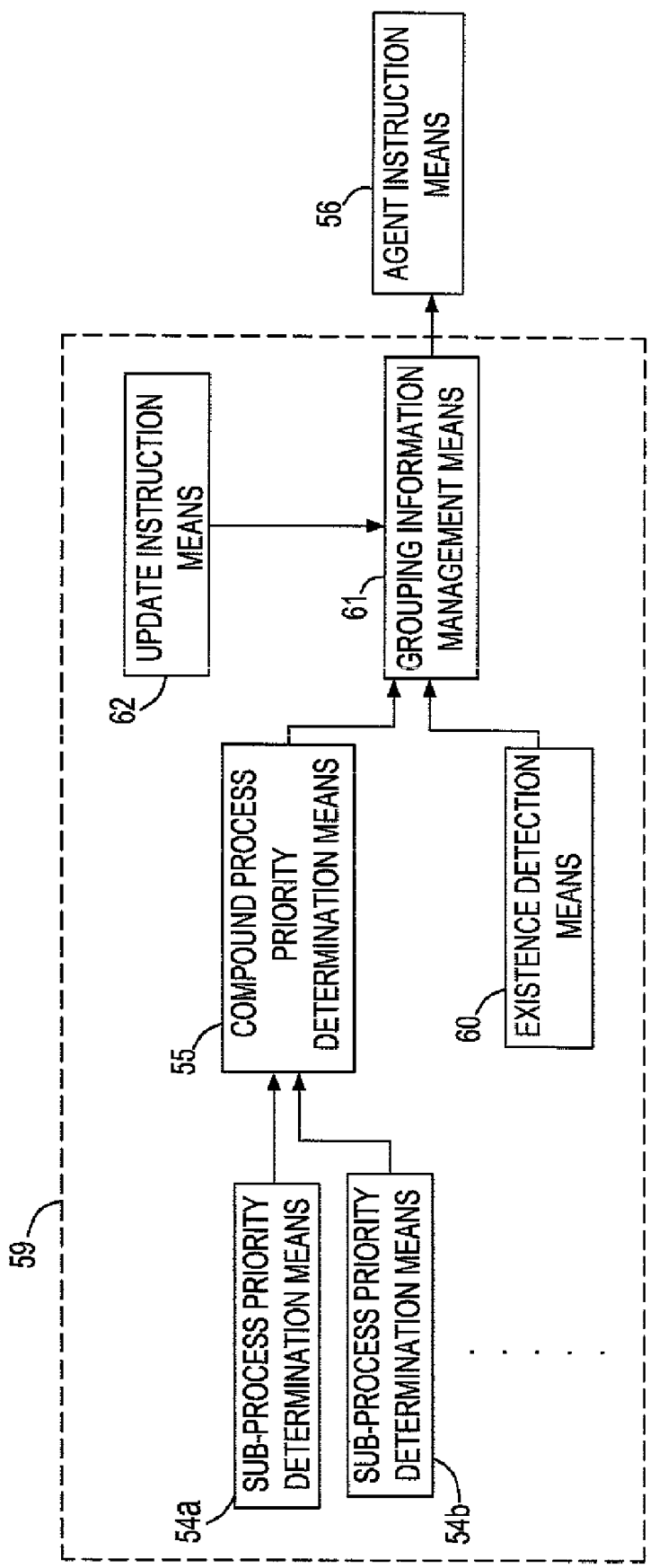
FIG. 8 is an overall block diagram of agent management means including the sub-process delivery priority determination means and compound process delivery priority determination means as its components in FIG. 7.

FIG. 8 is an overall block diagram of agent management means 59 including the sub-process priority determination means 54a, 54b, . . . and compound process priority determination means 55 in FIG. 7 as its components. The agent management means 59 includes the sub-process priority determination means 54a, 54b, . . . and compound process priority determination means 55. The agent management means 59 further has existence detection means 60 for detecting whether or not each agent 23 exists in the persistent storage 24, grouping information management means 61 for grouping the agents 23 and managing grouping information based on determination results of the existence detection means 60 and the compound process priority of each agent 23, and update instruction means 62 for instructing the grouping information management means 61 to update the grouping information. The agent instruction means 56 instructs the agents 23 to operate in order based on the grouping information of the agent management means 59.

Figure 9:
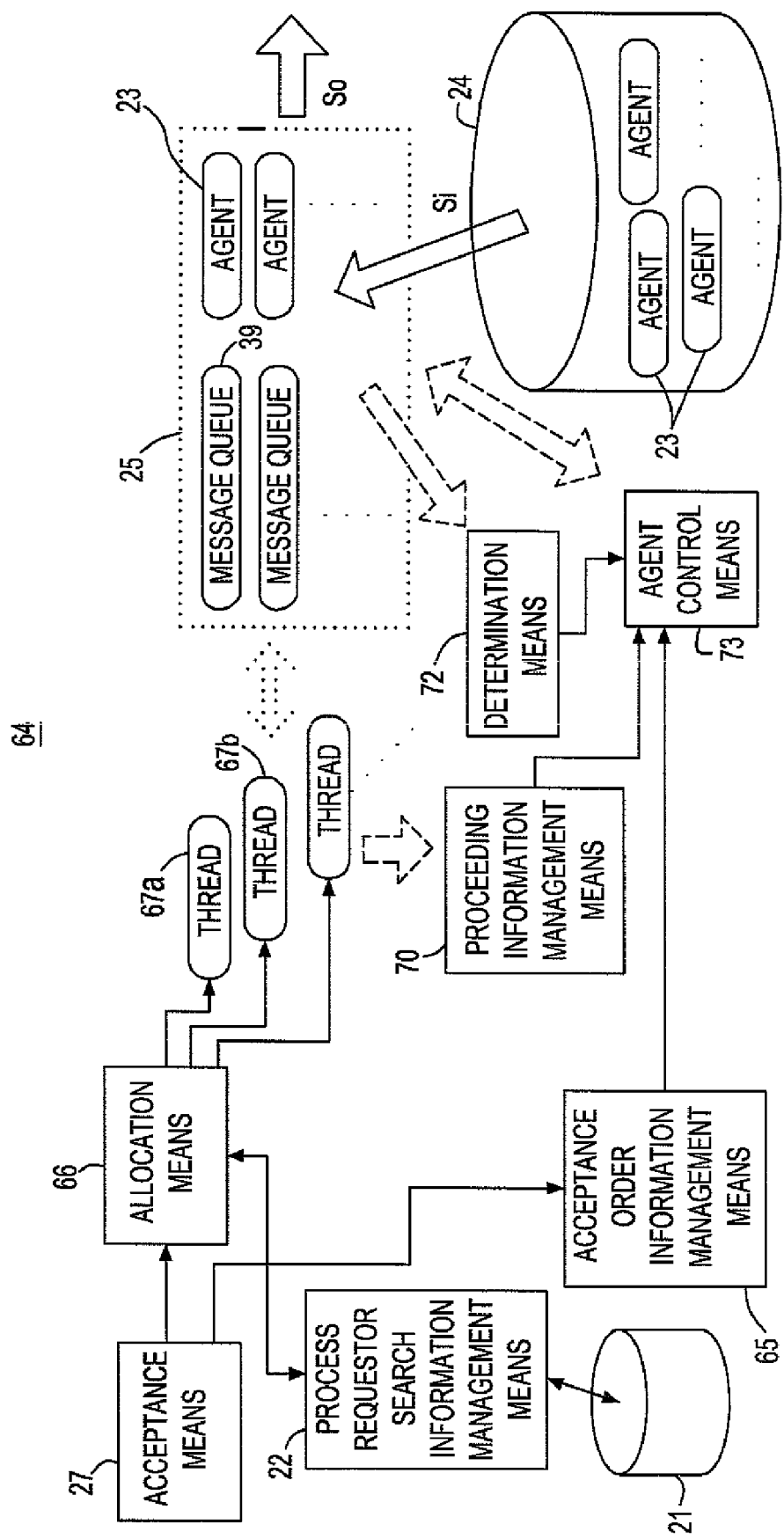
FIG. 9 is a block diagram of a message processing apparatus.

FIG. 9 is a block diagram of a message processing apparatus 64. The process requestor search information 21, process requestor search information management means 22, agents 23, persistent storage 24, cache memory 25, acceptance means 27 and message queue 39 in the message processing apparatus 64 are the same as those in the aforementioned message processing apparatus 20, and a description thereof will be omitted in order to mainly describe differences. Acceptance order information management means 65 manages acceptance order information on the agent activating events accepted by the acceptance means 27. A plurality of threads 67a, 67b . . . are mutually operable in parallel. The threads 67a, 67b . . . detect the process requestors to which the message generated due to the agent activating event is applied based on the process requestor search information 21 and inserts the message into the message queues 39 related to the process requestors. Allocation means 66 allocates to each of the threads 67a, 67b . . . the agent activating event to be processed by that thread. Proceeding information management means 70 manages proceeding information on the process by the threads 67a, 67b . . . as to each agent activating event accepted by the acceptance means 27. As for the agent activating event of which process proceeding information is the information on process termination of the threads 67a, 67b . . . (hereafter, referred to as a "determined agent activating event"), determination means 72 determines whether or not, of the agent activating events accepted by the acceptance means 27 prior to the determined agent activating event, there is any agent activating event of which processing by the threads 67a, 67b. . . is unfinished. Agent control means 73 controls the process by the agent 23 as to the message generated due to the determined agent activating event when it is determined that there is any agent activating event of which processing by threads is unfinished by the determination means 72. The agent control means 73 allows the process by the agent 23 as to the message generated due to the determined agent activating event when it is determined that there is no agent activating event of which processing by the threads is unfinished by the determination means 72.

In the case where the agent activating event immediately following the agent activating event determined as "no" in acceptance order is already determined as that there is any agent activating event of which processing by threads is unfinished, the determination means 72 changes the determination result from that there is any agent activating event of which processing by threads is unfinished to that there is no agent activating event of which processing by the threads is unfinished The agents 23 in FIG. 9 are designed to continuously process the plurality of continuous messages in the case of processing the message queue 39 in which the messages generated due to a plurality of agent activating events of which determination result by the determination means 72 is that there is no agent activating event of which processing by the threads is unfinished .

Figure 10:
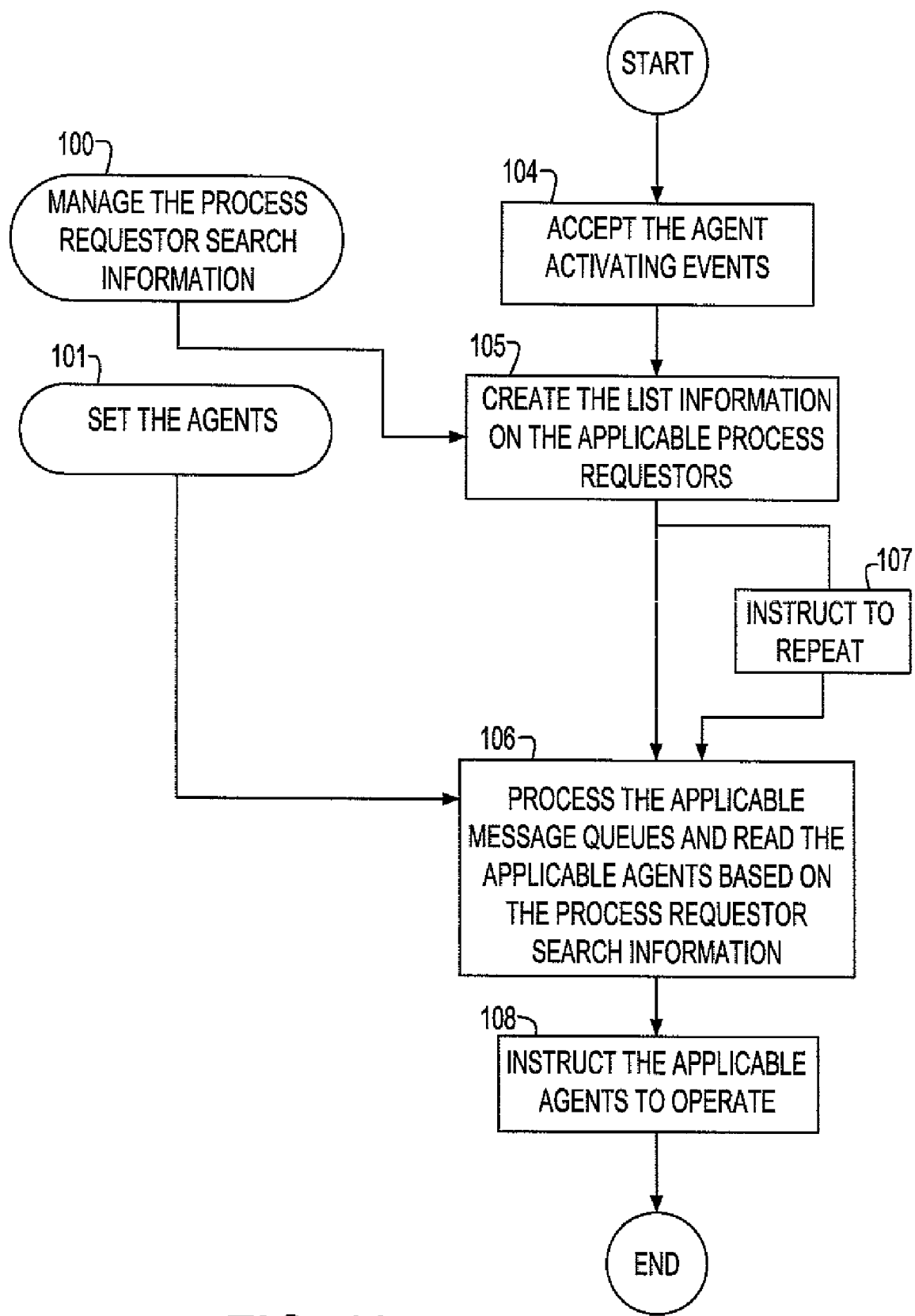
FIG. 10 is a flowchart of a message processing method.

FIG. 10 is a flowchart of a message processing method. In 100 (process requester search information management step), the process requestor search information 21 for searching for the applicable process requestor as to the agent activating event is managed. In 1104 (acceptance step), the agent activating event is accepted. In 105 (list information creation step), the list information on the process requesters to which the message generated due to the agent activating event is applied is created based on the process requestor search information 21. In 101 (agent setting step), a plurality of agents 23 are set up. In this setup, the agents 23 are associated with the process requestors, stored in the persistent storage 24, readable from the persistent storage 24 to the cache memory 25 as the program execution area and abandonable from the cache memory 25, and each agent 23 operates only when existing in the cache memory 25 to be able to process the message in the message queue corresponding to the agent 23. 106 (insertion and reading step) will be described later by referring to FIG. 11. In 108 (agent instruction step), the agent 23 related to the message queue 39 having the message inserted therein is instructed to operate. In 107 (repetitive instruction step), in the case where the unselected one remains among the process requesters included in the list information, the termination of the process of all the agents 23 in operation is awaited and an instruction to repeat 106 (insertion and reading step) is provided.

Figure 11:
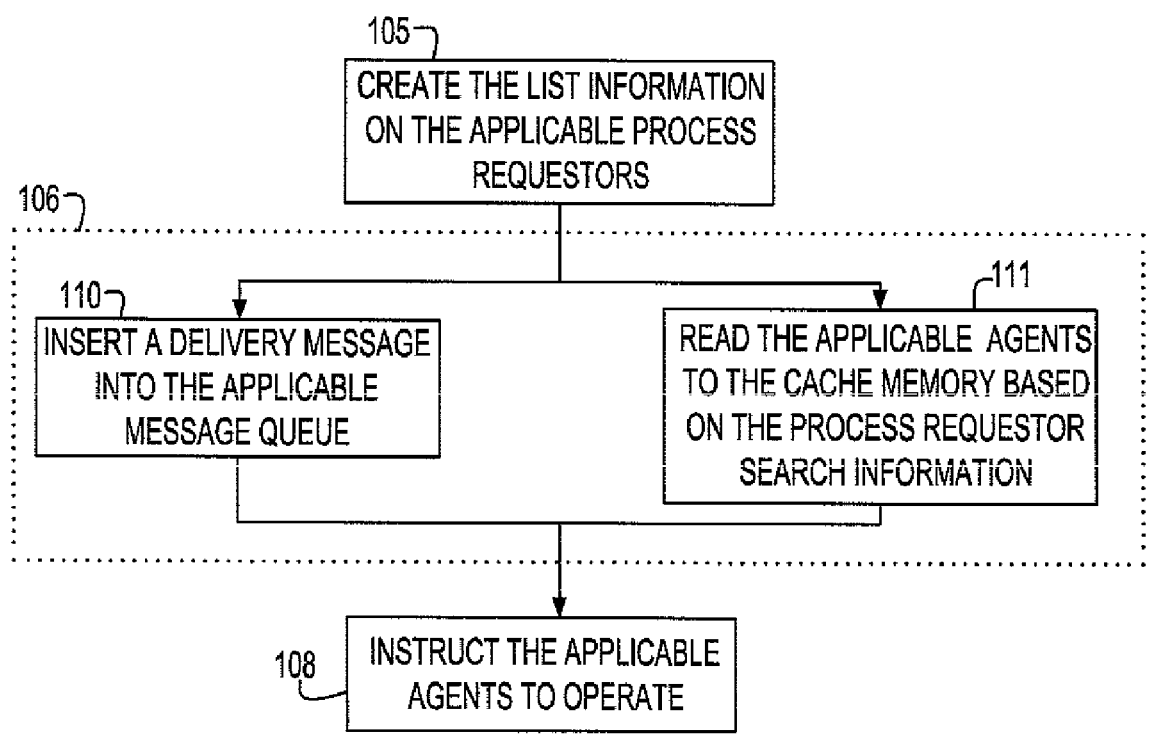
FIG. 11 is a detailed view of an insertion and reading step in the flowchart in FIG. 10.

FIG. 11 is a detailed view of 1106 (insertion and reading step) in the flowchart in FIG. 10. 106 includes 110 and 111. S110 and S111 can be performed either in parallel or in series time-wise. In the case where they are performed in series time-wise, the order of 110 and 111 is arbitrary. In 110, of the process requestors included in the list information, a plurality of unselected ones are selected as the process requesters to be inserted and read, and the message is inserted into the message queues 39 related to the process requesters to be inserted and read. In 111, the agents related to the process requestors are read from the persistent storage 24 to the cache memory 25.

Figure 12:
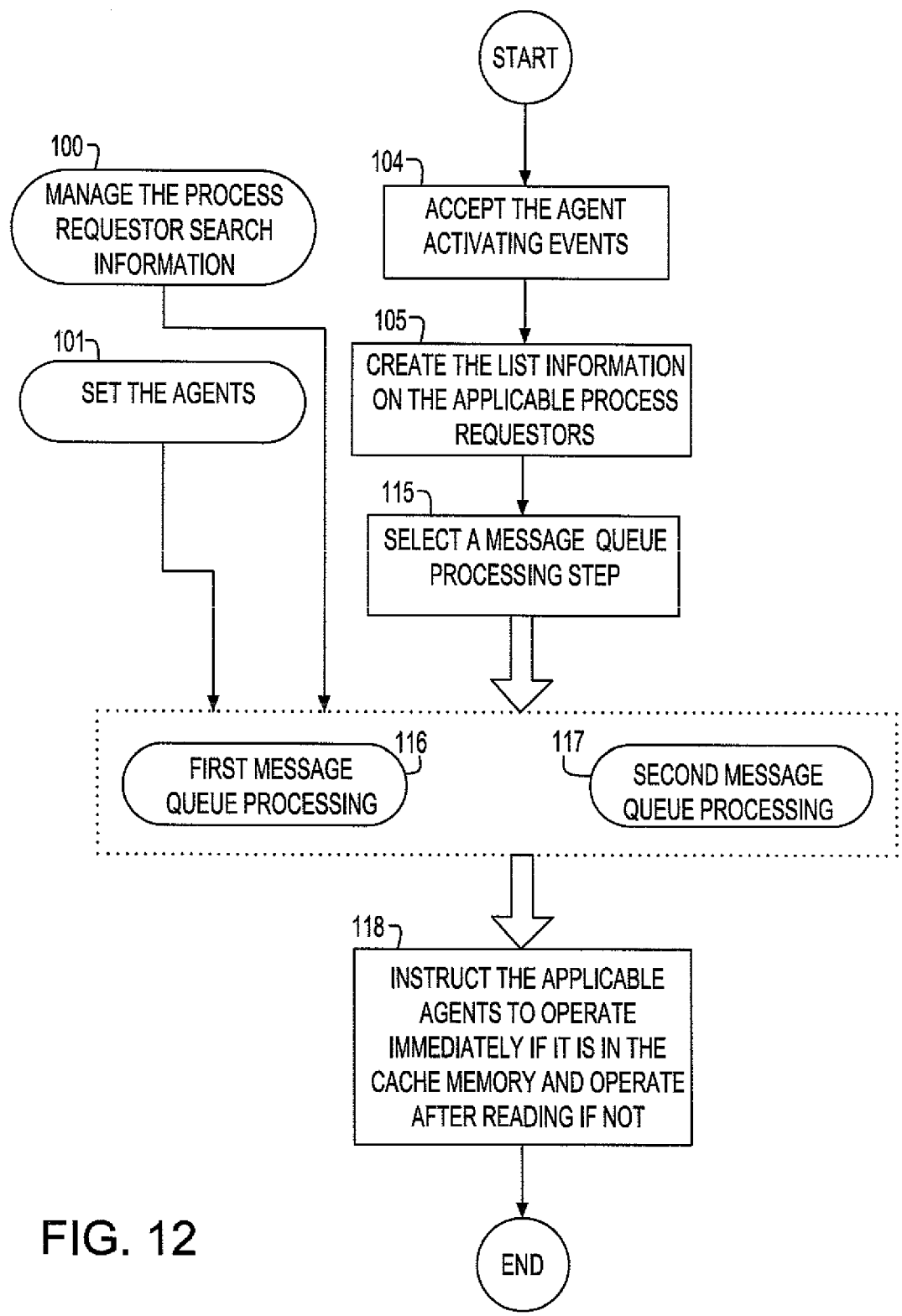
FIG. 12 is a flowchart of another message processing method.

FIG. 12 is a flowchart of another message processing method. 100, 101, 104 and 105 have the same contents as those in FIG. 10 and a description thereof will be omitted. In 115 (selection step), either 116 (first message queue processing step) or 117 (second message queue processing step) is selected. In 118 (agent instruction step), as to the agents 23 related to the message queue 39 having the message inserted therein, the agent 23 is immediately instructed to operate if the agent 23 is in the cache memory 25, and the agent 23 is read from the persistent storage 24 to the cache memory 25 and then instructed to operate if the agent 23 is not in the cache memory 25.

Figure 13:
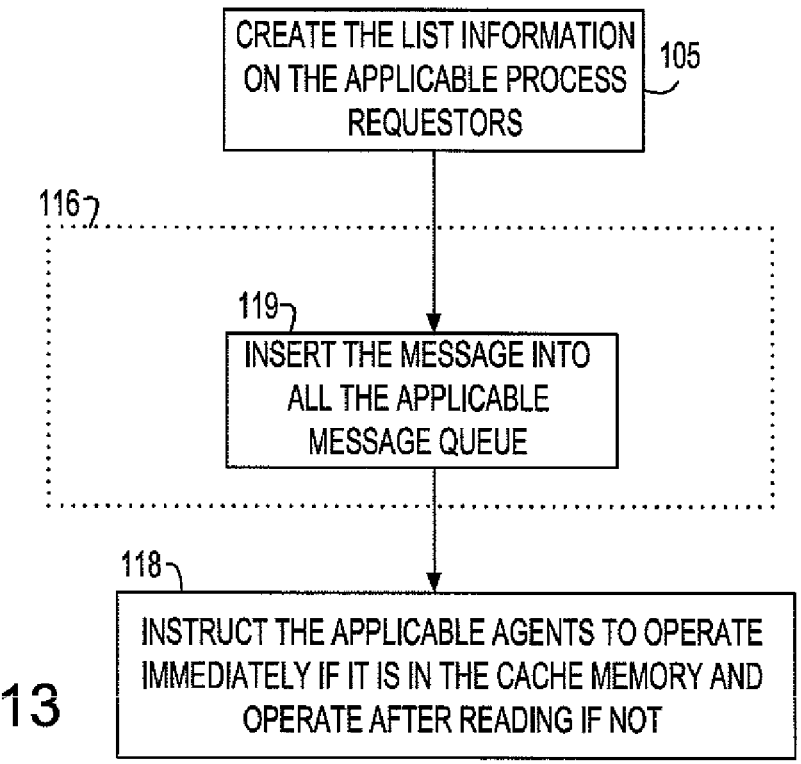
FIG. 13 shows a concrete process of a first delivery control step in FIG. 12.

FIG. 13 shows the concrete process of 116 (first message queue processing step) in FIG. 12. 116 (first message queue processing step) includes 119 (insertion step) for inserting the message into the message queues 39 related to all the process requestors included in the list information.

Figure 14:
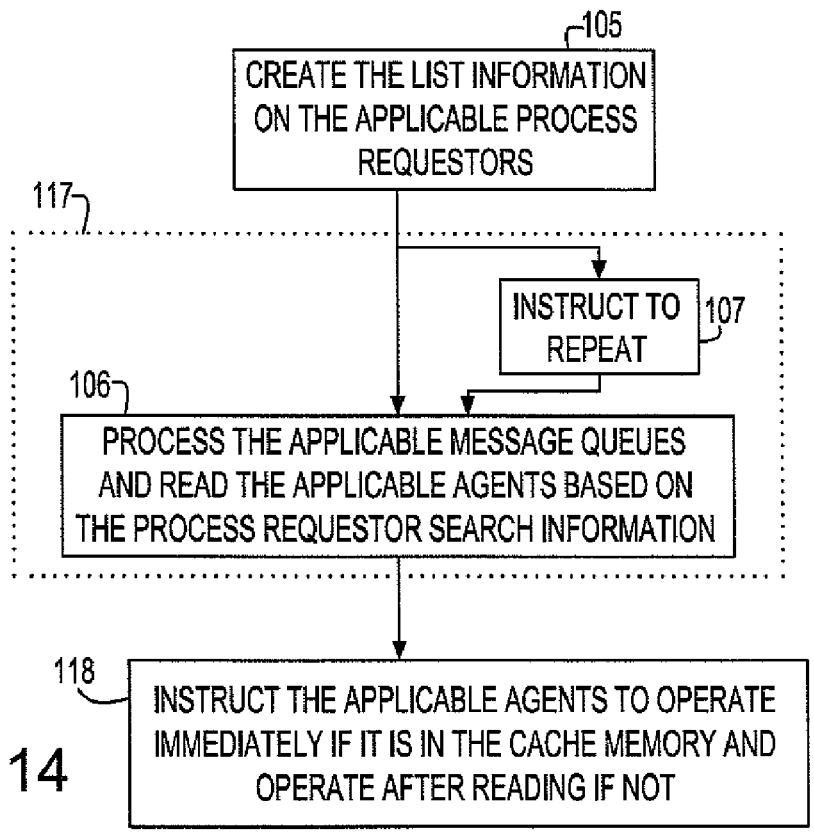
FIG. 14 shows a concrete process of a second delivery control step in FIG. 12.

FIG. 14 shows the concrete process of 117 (second message queue processing step) in FIG. 12. 117 includes 106 and 107. As 106 and 107 thereof are the same as 106 and 107 in FIG. 10, a description thereof will be omitted.

With reference to FIG. 12 again, the selection in 115 (selection step) is based on the instruction of the operator. Or the selection in 115 (selection step) is based on the estimated number of the process requestors to which the message generated due to the agent activating event of this time is applied, estimated hit rate in the cache memory 25 as to the agent 23 related to the process requesters to which the message generated due to the agent activating event of this time is applied, estimated work time, in the case where the process is allocated in 116 (the first message queue processing step), from the acceptance of the information in 104 (acceptance step) until obtaining the list information on the process requesters to which the message is applied and inserting the message into the message queues 39 of all the agents 23, estimated work time, in the case where the process is allocated in 117 (second message queue processing step), from the acceptance of the information in 104 (acceptance step) until obtaining the list information on the process requestors to which the message is applied and inserting the message into the message queues 39 of all the agents 23, estimated time from determination of use as to the agent 23 in the cache memory 25 until completion of the process by the determined agent 23, and/or estimated time from determination of use as to the agent 23 outside the cache memory 25 until the completion of the process by the determined agent 23.

Figure 15:
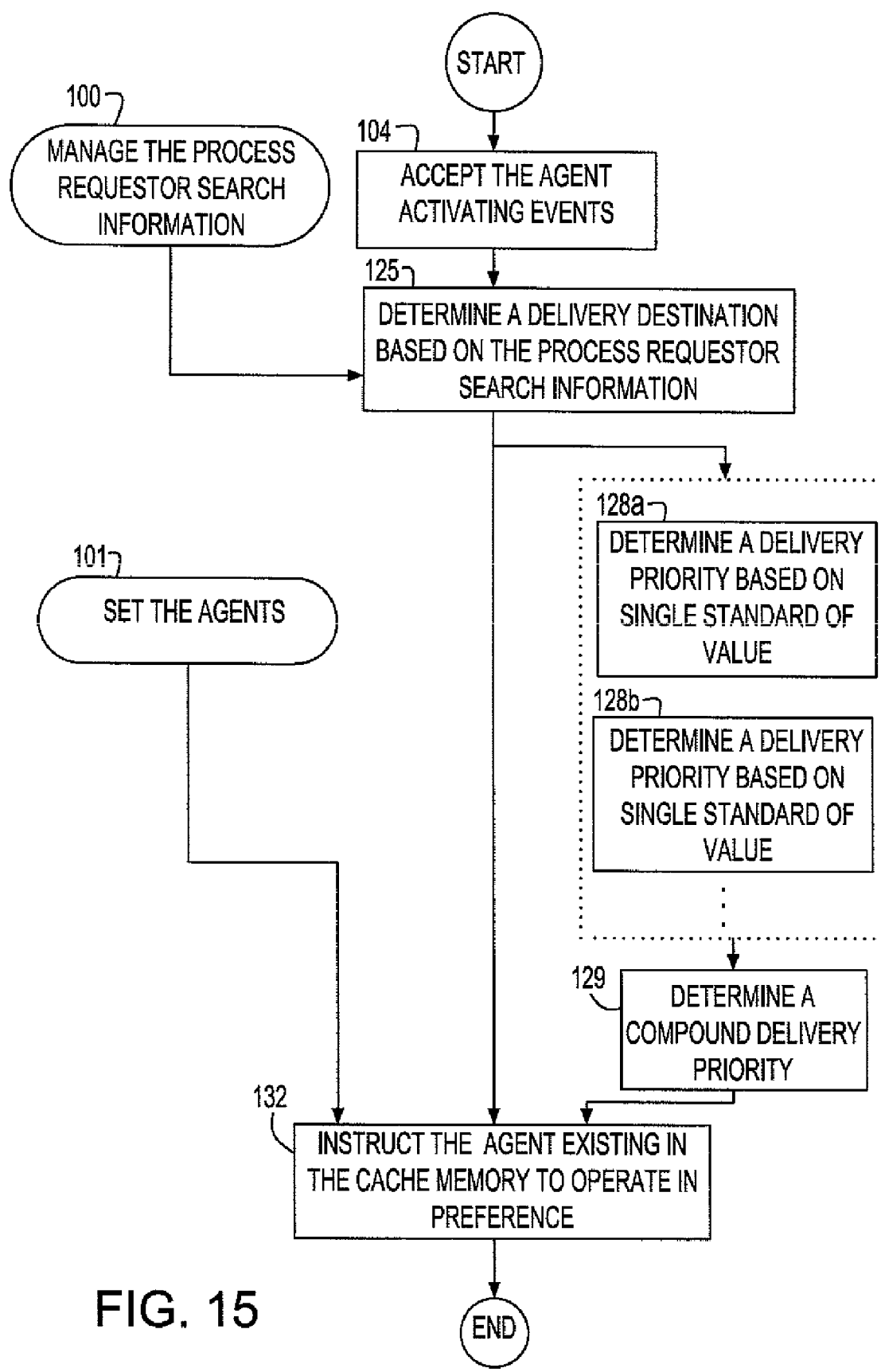
FIG. 15 is a flowchart of a further message processing method.

FIG. 15 is a flowchart of a further message processing method. 100, 101 and 104 are the same as those in FIG. 10, and a description thereof will be omitted. In 125 (process requestor determination step), the process requestor to which the message generated due to the agent activating event is applied is determined based on the process requestor search information 21. In at least one 128*a*, *b*, . . . (sub-process priority determination steps), the process priority about each message is determined as the sub-process priority based on the single standard of value. In 129 (compound process priority determination step), when the total number of the sub-process priority determination steps is two or more, the compound process priority about each message is determined based on the sub-process priority individually determined as to each message in each of the sub-process priority determination steps 128*a*, *b*, . . . , and when the total number of the sub-process priority determination steps is one, the sub-process priority determined in the one sub-process priority determination step (ex. 128*a*) as to each message is determined as the compound process priority. In 132 (agent instruction step), the message of the highest compound process priority among the messages held by each message queue is rendered as the message of the highest priority, and between the agents 23 related to the message queues of which compound process priority of the message of the highest priority is the same, the agent 23 existing in the cache memory 25 is instructed to operate in preference to the agent 23 not existing therein.

The standards of value adopted in 128*a*, 128*b*, . . . (sub-process priority determination steps) are related either to the contents of the message or to the process requestors to which the message is applied. Furthermore, the predetermined standard of value related to the contents of the message includes the one related to the emergency of processing of the message. The standard of value related to the process requesters to which the message is applied includes the one related to the rating of the process requestors.

When there are a plurality of messages held by the message queue related to the agent 23 having started the process in 132 (agent instruction step), the agent 23 continuously processes all those messages or the messages of which compound process priority is within the predetermined position in descending rank.

Figure 16:
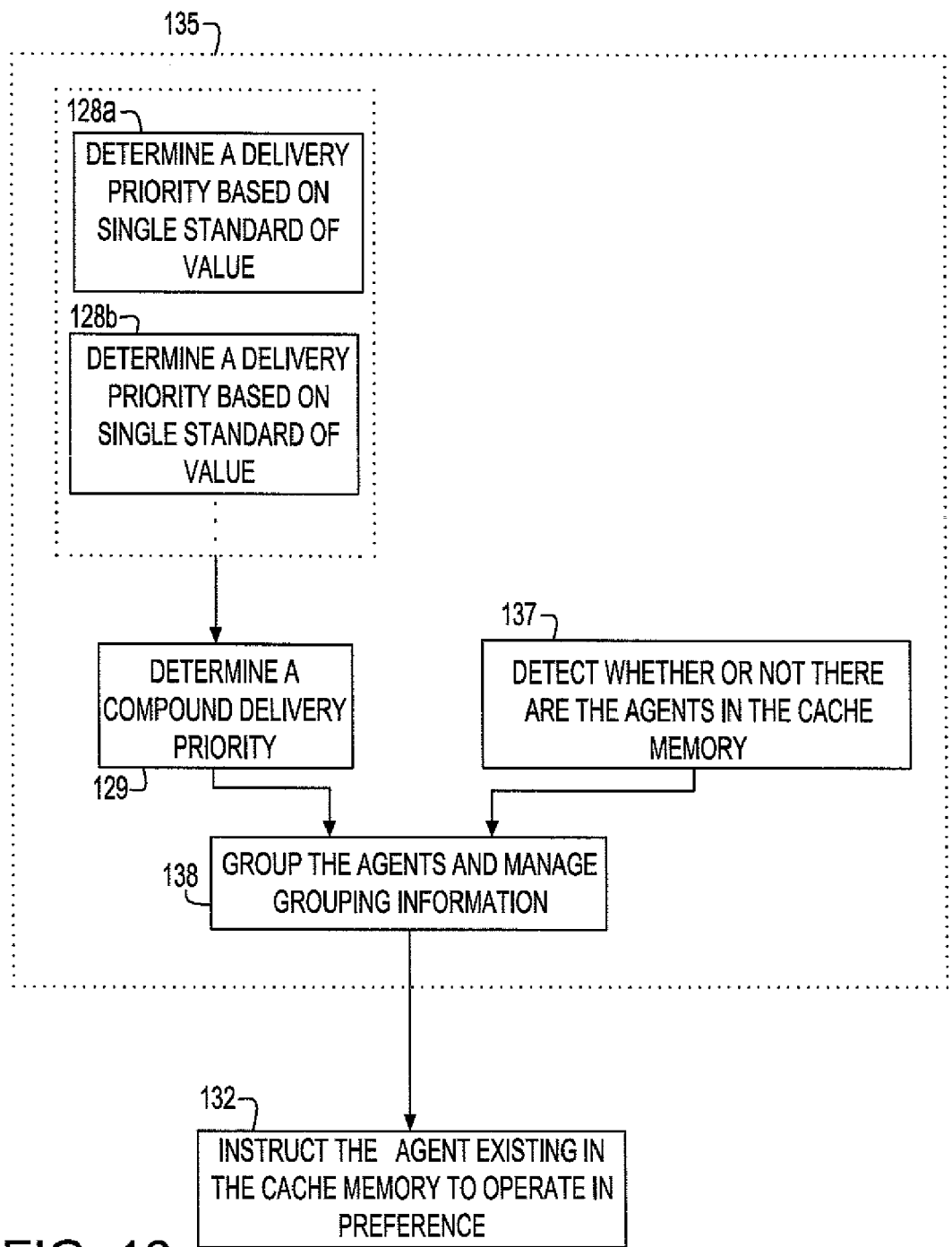
FIG. 16 is a flowchart of a portion of the message processing method having a high-order step including the sub-process priority delivery determination steps in FIG. 15.

FIG. 16 is a flowchart of a portion of the message processing method having a high-order step including 128*a*, 128*b*, . . . and 129 in FIG. 15 as sub-steps. 135 (agent management step) includes 137 and 138 in addition to 128*a*, 128*b*, . . . and 129. In 137 (existence detection step), it is detected whether or not each agent 23 exists in the persistent storage 24. In 138 (grouping information management step), the agents 23 are grouped, grouping information is managed, and the grouping information is updated as appropriate based on determination results of the 137 (existence detection step) and the compound process priority of each agent 23. In 132 (agent instruction step), the agents 23 are instructed to operate in order based on the grouping information in the agent management step.

Figure 17:
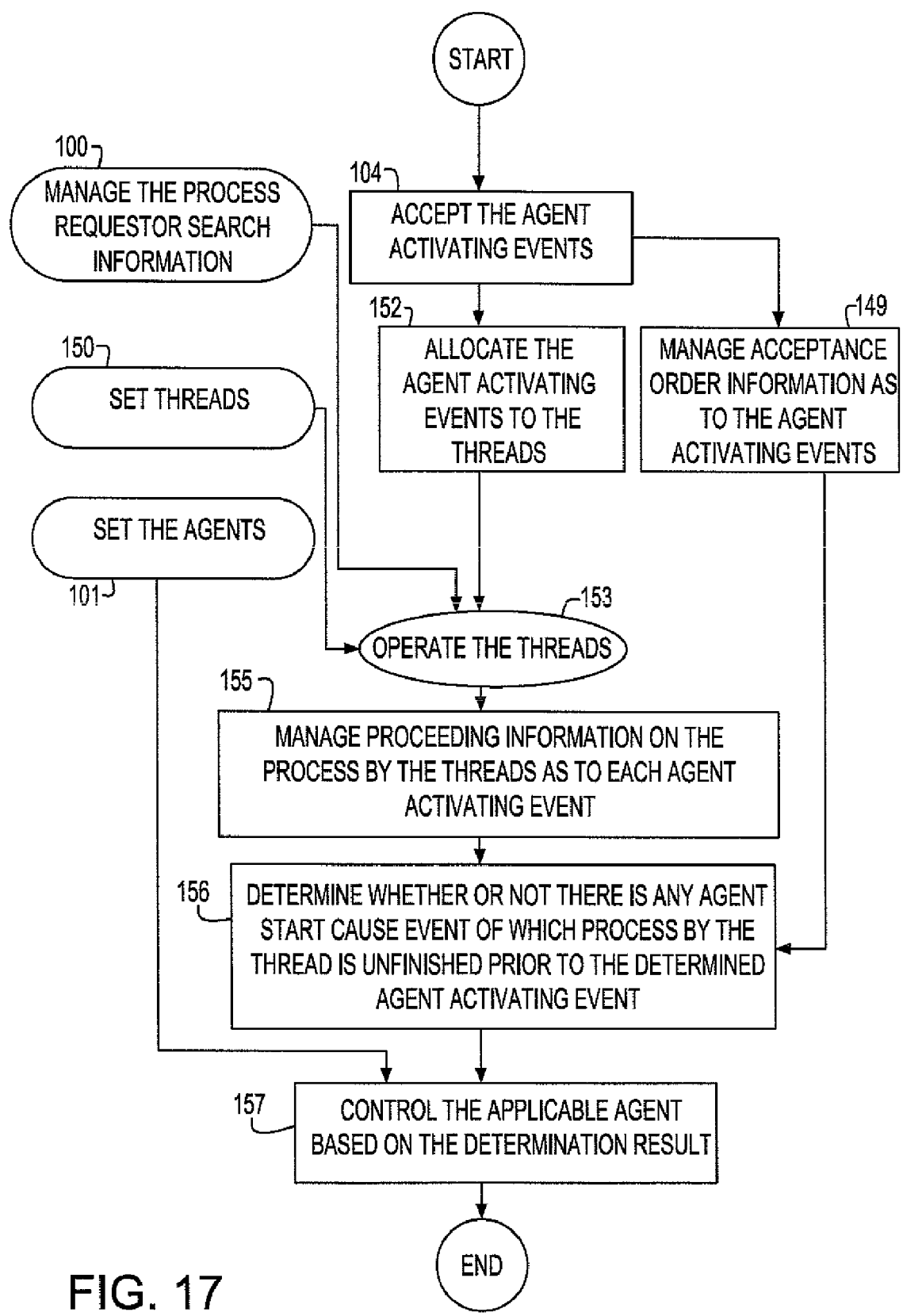
FIG. 17 is a flowchart of a still further message processing method.

FIG. 17 is a flowchart of a still further message processing method. 100, 101 and 104 are the same as those in FIG. 10, and a description thereof will be omitted. In 149 (acceptance order information management step), the acceptance order information on the agent activating events accepted in 104 (acceptance step) is managed. In 150 (thread setting step), a plurality of threads 67*a*, 67*b*, . . . are set up. According to this setup, the threads 67*a*, 67*b*, . . . are mutually operable in parallel, and detect the process requestors to which the message generated due to the agent activating event is applied based on the process requestor search information 21 and insert the message into the message queues 39 related to the process requesters. In 152 (allocation step), the agent activating event to be processed by each of the threads 67*a*, 67*b*, . . . is allocated thereto. Each thread thus having it allocated starts the operation in 153. In 153 (proceeding information management step), the proceeding information on the process by the threads 67*a*, 67*b*, . . . as to each agent activating event accepted in 104 (acceptance step) is managed. In 156 (determination step), as to the agent activating event of which process proceeding information is the information on process termination by the threads 67*a*, 67*b*, . . . (hereafter, referred to as a "determined agent activating event"), it is determined whether or not, of the agent activating events accepted in 104 (acceptance step) prior to the determined agent activating event, there is any agent activating event of which process by the threads 67*a*, 67*b*, . . . is unfinished.

Figure 18:
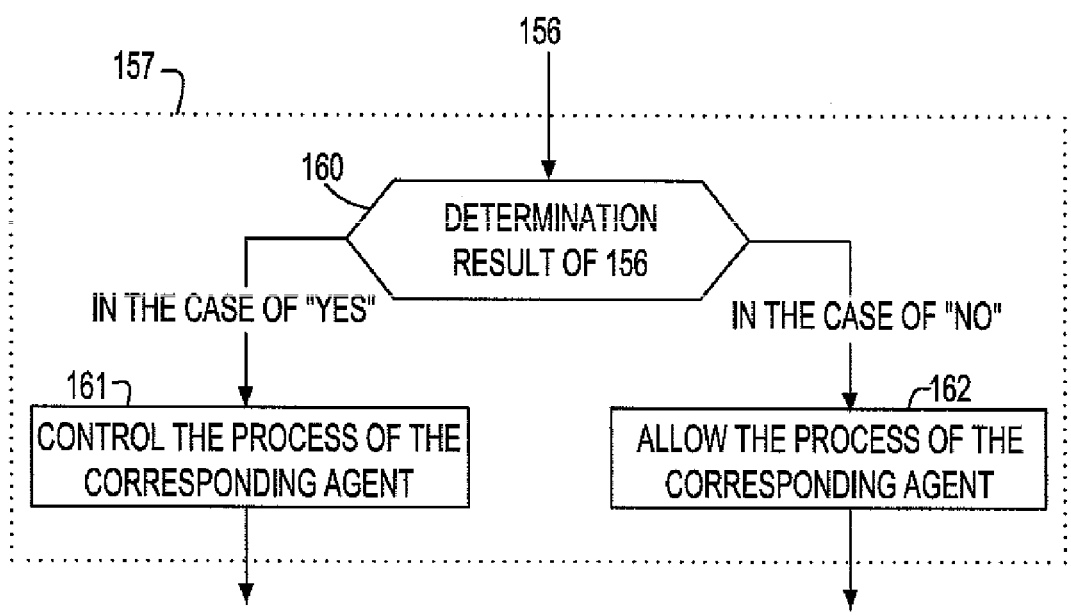
FIG. 18 is a diagram showing a concrete example of delivery process control of an agent control step in FIG. 17.

FIG. 18 shows a concrete example of delivery process control of 157 (agent control step) in FIG. 17. In 160, it branches to 161 or 162 based on the determination result of 156. To be more specific, it proceeds to 161 in the case where the determination result of 156 is "yes," and it proceeds to 162 in the case where it is "no."

In 161, the process by the agent 23 is controlled as to the message generated due to the determined agent activating event determined as "yes" in 156 (determination step). In 162, the process by the agent 23 is allowed as to the message generated due to the determined agent activating event determined as "no" in 156 (determination step).

In the determination step 156, it is preferable that, in the case where the agent activating event immediately following the agent activating event determined as "no" in the acceptance order is already determined as "yes," the determination result is changed from "yes" to "no." Thus, the process by the agent 23 is promptly started as to the message generated due to the next agent activating event. Furthermore, as for the setup of the agent 23 in 101 (agent setting step), it is preferable that, in the case of causing the agent 23 to process the message queue 39 in which the messages generated due to a plurality of agent activating events of which determination result by 156 (determination step) is "no" continue in the acceptance order direction, the agent 23 is set to continuously process the plurality of continuous messages.

EMBODIMENTS

The following embodiments are examples wherein the present invention is applied to a mail delivery apparatus as a concrete example of the message processing apparatus.

First Embodiment

The apparatus according to a first embodiment is equipped with a KeyOnlyCollection delivery mechanism or a SwapInCollection delivery mechanism as a method of, when delivering a delivery message related to delivery cause information to all delivery destinations on acceptance of the delivery cause information, effectively reading the agent from the persistent storage to the cache memory. Of the KeyOnlyCollection and SwapInCollection delivery mechanisms, the apparatus selects the one of better processing efficiency according to the situation. Characteristics of the first embodiment will be described.

[Message Delivery Service]

On the Internet, it is possible to consider not only request-response type service for receiving a user request and returning a result but also event processing type service for having the user's taste, attribute and request information registered on the server and performing a certain process by using the user information when an event occurs on the server side. For instance, as for stock price delivery service, a request such as "send a notice by e-mail if the IBM's stock price becomes 100 dollars or higher" is thinkable. In such service, the stock is "IBM" for a certain user and "Microsoft" for another user. In addition, a threshold of the stock price (concrete stock price such as $100 or $150) is different among the users. For instance, even if interested in the same IBM's stock price, another user may "want a notice if it becomes less than 90 dollars." Furthermore, there may be the users who "want a notice if the profit of investment becomes 1,000 dollars or more" or "want a notice if it becomes 10 percent higher than the stock price purchased last time." On the other hand, the number of the Internet users may exceed several hundred thousand to several million. Therefore, a site for providing the event processing type service must provide the service to such a huge number of users so that the performance becomes extremely important.

There is an agent server as a framework and an execution environment for the sake of realizing such service. This framework generates each user's agent on the server. The agent is an object having a mechanism for processing the user data and messages. If a certain event (corresponding to the aforementioned message cause information) occurs on the server, the message representing it is generated so that each agent processes the message. In this case, the key to improve performance is to perform only the process of the agent related to the message rather than to perform the message process of all the agents. For that reason, each agent registers the condition for an interesting message in advance, and the agent server refers to the registered condition so as to process the message for a necessary agent.

If one event occurs, a very large number of agent processes must be performed in order to process that message. On the other hand, there are the cases where such events consecutively occur. Therefore, it is important for the agent server to perform a series of agent processes in conjunction with the event occurrence as efficiently as possible.

[Agent Server Overview]

Figure 19:
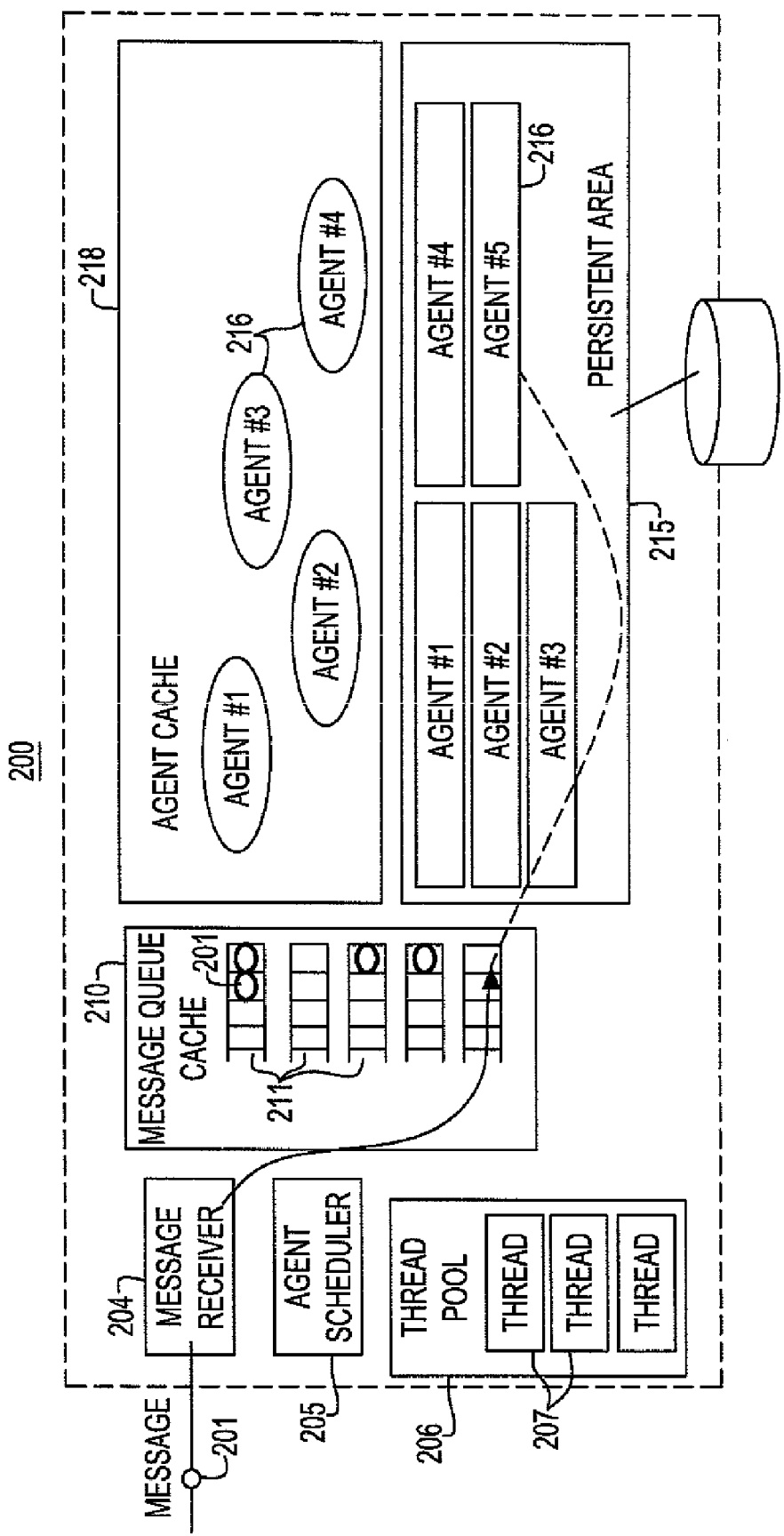
FIG. 19 is a schematic block diagram of an agent server.

FIG. 19 is a schematic block diagram of an agent server 200. The reference numerals indicate the following elements.

Figure 20:
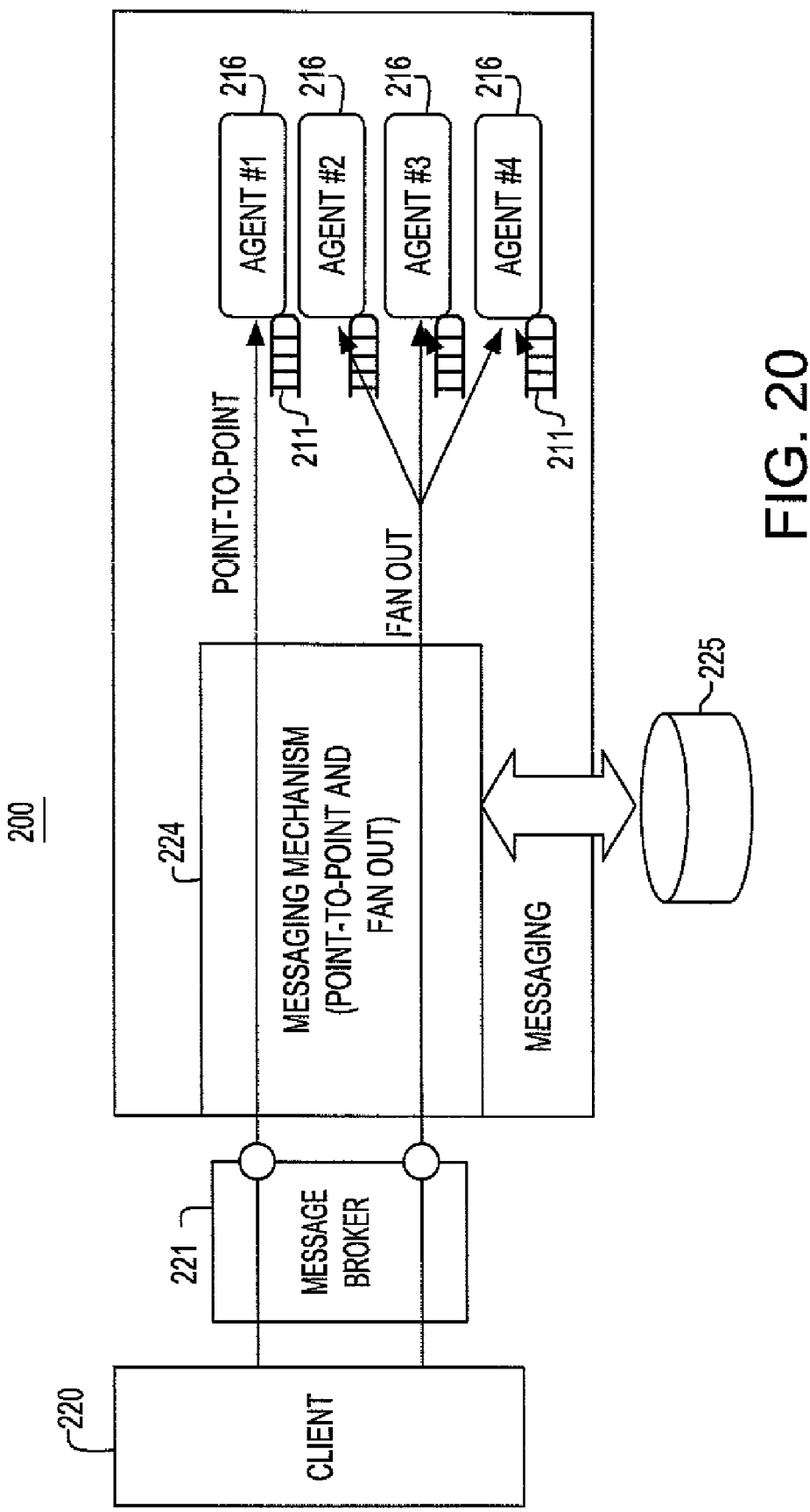
FIG. 20 is an explanatory diagram of various delivery methods by the agent server.

201: Message
204: Message receiver
205: Agent scheduler
206: Thread pool
207: A plurality of threads placed in the thread pool 206
210: Message queue cache
211: A plurality of message queues placed in the message queue cache 210
215: Persistent area (secured in a hard disk drive or a magnetic tape for instance)
216: A plurality of agents
218: Agent cache FIG. 20 is an explanatory diagram of various delivery methods by the agent server 200. The reference numerals indicate the following elements. A description will be omitted as to those having the same reference numerals as in FIG. 19.

220: Client
221: Message broker
224: Messaging mechanism
225: Subscription table In FIG. 19, the message 201 is accepted by the message receiver 204 and inserted into the message queues 211 corresponding to delivery destinations. The number of delivery destinations for one message 201 is several hundred thousand to several million in typical cases. The agent scheduler 205 operates the agents 216 related to the message queues 211 having the message inserted therein according to a predetermined schedule. The agents 216 must be called by the agent cache 218 prior to the operation. To increase efficiency of the entire agent server 200, the entire processing is divided into a plurality so as to utilize the process by a multi-thread method in each divided portion.

In FIG. 20, the client 220 is installed as the application in the computer equivalent to the aforementioned information source client 15 in FIG. 1 and having an information source of stock prices and so on. The message broker 221 receives various kinds of information from each client 220, and sends corresponding information to the agent server 200. The message broker 221, client 220 and agent server 200 are connected via the Internet though not especially limited thereto. As for the delivery cause information as the message received from the message broker 221, the messaging mechanism 224 detects all the delivery destinations of the delivery message related thereto based on the subscription table 225. The delivery in the case where there is one delivery destination as to a piece of delivery cause information is referred to as "Point-to-Point," and the delivery in the case where there are a plurality of delivery destinations as to a piece of delivery cause information is referred to as "FanOut."

[Agent Server Overview]

The agent server 200 has a mechanism for storing the data on each individual agent in the persistent area 215 and reconfiguring each agent from that data on the memory. A disk, a database and so on are used for the persistent area 215. Furthermore, it has a mechanism for caching the agent on the memory of the agent server 200 in order to improve performance (hereafter, this cache is referred to as an "agent cache 218"). The agent server 200 manages the agent itself as well as the delivery of the message 201 to the agent. The agent server 200 receives the message 201 sent from the outside, and delivers the message 201 to the agent managed by that agent server 200.

As for typical methods of delivering the message 201, there are the Point-to-Point (P2P) for delivering one message 201 to a specific agent and the FanOut for delivering one message 201 to a plurality of agents. In the case of FanOut, there are a method whereby each agent registers in advance the kind of the message 201 desired to be received, and when the agent server 200 performs the FanOut, it refers to that registered information so as to select the agent to which it should be delivered (hereafter, referred to as "Pub/Sub") and a method whereby it is unconditionally delivered to all the agents (hereafter, referred to as "Multicast"). The agent server 200 has the message queue 211 for each agent in order to deliver the message 201 to the agents. On receiving the message 201 sent from the outside, the agent server 200 identifies the agent to which the message 201 should be sent to, and stores the received message 201 in the message queue 211 of the applicable agent.

Of the agents 216 having the message 201 in the message queue 211, the agent server 200 selects an appropriate one and allocates to it the thread in the thread pool 206. The thread calls a message handler routine (hereafter, referred to as a "message handler") of the agent 216 to which it is allocated. In this case, if there is no agent 216 to which the thread 207 is allocated in the agent cache 218, the data on the agent 216 is read from the persistent area 215 and the agent 216 is reconfigured to be put in the agent cache 218 (such a process is referred to as "Swap In"). As the number of the agents to be held in the agent cache 218 is limited, in the case where the agent cache 218 is already full, the agents 216 to which the thread 207 is not allocated are abandoned from the agent cache 218 (this process is referred to as "Swap Out"). When allocating the thread 207 to the agents 216, the performance is significantly influenced by which agent 216 the thread 207 is allocated to first. This is performed by the agent scheduler 205. A typical application of the agent server 200 is "notification service" such as "stock profit and loss notification service." As for such an application, if the stock price is updated, the agents 216 of all the users interested in the updated stock price must be processed. There are the cases where several thousand to several hundred thousand agents 216 are processed at a stretch. To improve the performance, it is important to decrease the number of times of the Swap In and Swap Out. It is because the Swap In and Swap Out involve access to the persistent area 215 and this cost (temporal cost) is very high for ordinary disks and databases. The agent server 200 has three characteristics which are important for the sake of improving the performance. First, it processes the agents 216 on receiving an asynchronous message 201. Here, "asynchronous" means that it does not have to process them immediately. In the case of a synchronous process, there exists a program waiting for the processing result of the message 201, and so the system having received it needs to process it and return the result as soon as possible. In the case of the asynchronous process, however, it is not necessary to immediately return the result. To be more specific, the agent server 200 can processes the agents 216 in any order. Secondly, the agent server 200 has the message queue 211 of each agent 216. The message 201 sent to the agent 216 is once put in the message queue 211 of that agent 216. Thus, the agent server 200 can learn which agents 216 are waiting for the process (there is the message 201 in the message queue 211) and which agents 216 are not waiting for the process. Thirdly, the agent server 200 manages the agent cache 218. To be more specific, it knows which agents 216 are in the memory and which agents 216 are not in the memory.

[Agent]

The agent referred to here is an object having a handler routine for processing the message and on receiving the message, processing it by using the data held by that agent. The agent is persistent, and the data managed by each agent is stored in the database (the database is included in the concept of the persistent area). Each agent has an "agent key" for identifying it, and the agent server can identify the agent from the agent key.

[Agent Server and Its Management Mechanism]

The agent server is one program, which is the program for managing execution of several hundred thousand to several million or more agents. This program has a thread pool mechanism, and allocates the limited number of threads to the agents as appropriate so as to call the message handlers of the agents. This program also manages the message queue created to each agent, and temporarily puts the message delivered to the agent in this queue so as to take the message out of this queue when allocating the threads and pass it as the argument of the message handler.

The agent server has an agent cache mechanism capable of temporarily holding the agents on the memory. In the case where the object of the applicable agent is on the cache immediately before calling the message handler of the agent, the agent server utilizes that object. However, the cache size is limited so that all the agents are not on the cache. In the case where the object of the agent is not on the cache, it abandons the objects of other agents on the cache (hereafter, this process is referred to as "Swap Out"), reads the data on the applicable agent from the database by SQL (Structured Query Language) search process and pastes it as the object of the agent on the cache (hereafter, this process is referred to as "Swap In").

The agent server allocates the threads to the agents on the agent cache in preference in order to decrease the number of times of access to the database as much as possible. In the case of performing the Swap Out, it is performed in preference from the agents of which message queue is empty.

[Subscription]

The agent stores the information indicating the kind of messages in which it is interested in the table of the database (hereafter, referred to as a "subscription table"). For instance, if it wants to receive the message indicating that the IBM's stock price exceeded 100 dollars, the agent key for identifying the agent, "IBM" as the stock, and "100 dollars" as the threshold are stored in the table of the database. If a certain message arrives at the agent server, a message delivery mechanism refers to the contents of the message, obtains a list of the agents to which it should be delivered from the subscription table, and puts the message in each message queue. Thereafter, the agent server calls the message handlers of the agents as appropriate according to adequate scheduling.

[Agent Search Mechanism]

The agent server specifies a search condition to the database, and provides a mechanism for returning a list of the agent keys meeting that condition. The data on the agents is stored in the table of the database. This table also includes the agent keys. Therefore, it is possible, by performing the SQL search over the table, to obtain the list of the agent keys meeting the condition. The following two methods (a) and (b) are adopted as the search methods.

(a) KeyOnlyCollection Delivery Mechanism:

The method of reading all the agent keys meeting the search into the agent server and generating list objects to return them to a calling program. There are reading methods of reading all the agent keys at a stretch and sequentially reading them. In the latter case, the agent keys are sequentially obtained from the list objects returned to the calling program, and at the same time, one group of the agent keys including the next agent key is read into the memory from the database in the case where the agent key to be obtained is not in the memory yet. The applicable agent is not swapped in by this method.

(b) SwapInCollection Delivery Mechanism:

The list object representing the list of the agent keys meeting the search is returned to the calling program. By this method, the agent keys are read and the data on the agents is also read at the same time so as to swap in the objects of the agent to the agent cache. The method of reading the agent keys is performed in the same way as the method of sequentially reading them of the KeyOnlyCollection delivery mechanism. The agents are read from the database by the SQL search process in which the list was obtained rather than performing a new SQL search.

The characteristics and advantages of the methods (a) and (b) are as follows.

(a) KeyOnlyCollection Delivery Mechanism:

This method has no influence over the agent cache. The agent server schedules processing order of the agents so as to decrease the Swap Ins/Outs as much as possible by utilizing the information of the agent cache. Therefore, it is possible, by this method, to schedule the processing of the agents by utilizing the information of the agent cache at the maximum. In addition, the overhead for obtaining the list of the agent keys is low. Therefore, this method is effective in the case where the agent cache is large and the cache hit rate is high or in the case where the agent cache size is small but the search result is biased and most of the list of the agent keys is in the agent cache.

(b) SwapInCollection Delivery Mechanism:

According to this method, an adequate number of agent keys is read from the list of the agent keys and the message is put in the message queue thereof, and if the agent completes the process of the message, the next adequate number of agent keys are obtained from the list so as to perform the same process. In this case, as the SwapInCollection is utilized, the agents corresponding to the keys which are not in the agent cache are collectively swapped in concurrently with reading of the agent keys from the list. It is possible, by this reading, to swap in a plurality of agents at a very high speed compared to the case where the Swap In of one agent is repeatedly performed a plurality of times. Therefore, it is effective in the case where the agent cache size is smaller than that of the list of the agent keys and the cache hit rate is low. The start of each agent is managed by the scheduler as a mechanism separate from the KeyOnlyCollection delivery mechanism and SwapInCollection delivery mechanism. If the agent to be started is not in the agent cache, the scheduler reads the agent from the persistent area to the agent cache. When the SwapInCollection delivery mechanism is in operation, it is ensured that the agent related to the message queue having the delivery message inserted therein is read into the cache memory so that the scheduler does not need to read the agent from the persistent area to the agent cache.

[Message Delivery Method]

After putting the message in an agent queue (=message queue), the message delivery mechanism can know that a certain agent completed the process of that message. By way of example, there is the method of using a message listener. The message delivery mechanism can associate a message listener object (hereafter, referred to as the "message listener") with the message. If a certain agent completes the message process and there is the message listener associated with the message, the agent server calls a call back routine thereof. Thus, the message delivery mechanism can know the completion of the message process. In the case of delivering one message to a plurality of agents, it is possible to provide a counter to the message listener of the message so as to know whether or not all the agents completed the process of that message.

As an example of this implementation, the case of using WebSphere EJB+Programming Model Extensions (PME) will be described. If an SQL statement is given as a tool, EJB can generate a Finder method for performing a search. In that implementation, the Finder method executes the given SQL statement, and returns Collection of an EJBObject instance which is a proxy showing an EntityBean instance for wrapping an applicable record. In this case, when generating the Finder method the PME can specify which of the KeyOnlyCollection delivery mechanism and SwapInCollection delivery mechanism should be a Collection object of a return value of the Finder method.

Here, a Messenger class and a MessageListener class are defined as follows. A line number is inserted at each line head. "//" means a comment line.

```
Messenger class:
10:public class Messenger {
11:   javax. jms. Message msg;
12:   MessageListener listener;
13:   public Messenger (javax. jms. Message m, MessegeListener lstnr) {
14://In line 13, set m as a message and lstnr as a listener to msg and
listener.
15: }
16:   public void postTo (AgentKey key) {
17:
18://Line 17 describes the process of putting the message in the agent
queue of the agent specified by Key.
19: }
20:}
```

Lines 11 and 12 perform variable declaration of msg and listener. Lines 13 to 15 define the method Messenger, and Lines 16 to 19 define the method postTo. The m, lstnr and key are the arguments of the methods.

```
MessageListener class:
30:public class MessageListener {
31:   int count = 0;
32:public MessageListener (int c) {
33:   //The process of setting the number of times of putting the message
in the agent queue is described here.
34:   }
35:   public void completed ( ) {
36:      synchronized (this) {
37:         count --; //Decrease the counter by 1
38:         if(count == 0) {
39:            //If all the agents complete the message process
40:            //Wake up the thread waiting on this Message
41:            //Listener object
42:         }
43:      }
44:   }
45:}
```

Here, the AgentKey class is a class of the agent keys for identifying the agents, where an AgentKey instance can be obtained from the EJBObject instance held by the Collection object which is the return value of the Finder method. In addition, a completed method of the MessageListener object is called each time a certain agent completes the message process. In the case where the variable listener of the Messenger object is null, the execution environment of the agent server does not call the completed method.

The message delivery mechanism performs the following process by using the above-mentioned classes. The KeyOnly delivery mechanism has the delivery message inserted into each message queue related to each destination based on the list of all the destinations to which the delivery message of this time will be delivered (line 67). The SwapIn delivery mechanism takes out 20 destinations each time based on the list of all the destinations to which the delivery message of this time will be delivered (lines 75 to 80), reads the agents related to the destinations taken out into the agent cache (lines 81 to 82), inserts the delivery message into each message queue related to each of the destinations taken out (lines 86 to 89), and waits thereafter until all the agents related to the destinations taken out finish the process (lines 90 to 93).

[KeyOnly Delivery Mechanism]

```
60:javax. jms. Message msg = //The message received from a JMS
provider is set.
61:KeyOnlyCollection collection = //A search is performed by the
Finder method.
62:Messenger msgr = new Messenger (msg, null);
63:Iterator it = collection. iterator ( );
64:while (it. hasNext ( )) { //Repeated while there is the element.
65: EJBObject obj = (EJBObject) it. next ( ); //The EJBObject is taken
out.
66: AgentKey key = //The agent key is obtained from obj.
67: msgr. postTo (key)
68:}
```

[SwapIn Delivery Mechanism]

```
70:javax. jms. Message msg = //The message received from the JMS
provider is set.
71:SwapInCollection collection = //A search is performed by the Finder
method.
72:Iterator it = collection. iterator ( );
73:while (true) {
74:Vector list = new Vector ( );
75:for (int i=0; i<20; i++) { //The process is divided into 20 elements to
be performed each time.
76:    if(!it. hasNext ( )) break; //It is finished if there is no element.
77:    EJBObject obj = (EJBObject) it. next ( ); //The EJBObject is taken
out.
78:    AgentKey key = //The agent key is obtained from obj.
79:    list. addElement (key)
80: }
81: //At this time, the above 20 agents are held
82://by the agent cache.
83:    if (list. isEmpty ( )) break; //It is finished if the list is empty.
84:MessageListener listener = new MessageListener (list. size ( ));
85:Messenger msgr = new Messenger (msg, listener);
86:for (int i=0; i<list. size ( ); i++) { //The list is processed.
87:    AgentKey key = (AgentKey) list. elementAt (i)
88:    msgr. postTo (key) //The message is put in the agent queue.
89: }
90:    synchronized (listener) {
91:        //Waits until the processing of all the agents having performed
postTo is finished.
92:        if (listener. count > 0) listener, wait ( );
93:    }
94:}
```

According to the first embodiment, an administrator can manually switch between the KeyOnlyCollection delivery mechanism and SwapIn delivery mechanism as appropriate. It is also possible to adopt an automatic switching method instead of being manually switched by the administrator. A "delivery method determination mechanism" equipped with the automatic switching method will be described. This mechanism determines whether to utilize the KeyOnly delivery mechanism or SwapIn delivery mechanism as the mechanism for delivering the received messages by utilizing the eight pieces of information indicated below (including the cases of a portion thereof). As for the mechanism to be selected, the costs of both the methods are calculated based on estimated values of the following 3 to 8 so that it is determined from the values thereof.

Here, it is arbitrary as to what method the following eight pieces of information are obtained by and how to calculate the costs therefrom.

(1) Message attribute information (an attribute representing the type of the message, a "stock price notice" and so on for instance)
(2) The type of agents to which it should be delivered
(3) The estimated value of the number of the agents to which the message should be delivered (hereafter, referred to as "N")
(4) The estimated value of a cache hit rate in the case of calling the agents supposed to process the message (hereafter, referred to as "R")
(5) The estimated value of the time required in the KeyOnly delivery mechanism, is measured after receiving the message, from obtaining the list of key information on the agents to which it should be delivered and to putting the message in the message queues of all the agents corresponding to the obtained key information (hereafter, referred to as "$T_k$"). It does not include the time for the agents to process the message.
(6) The estimated value of the time required in the SwapIn delivery mechanism, after receiving the message, to obtain the list of the key information on the agents to which it should be delivered and put the message in the message queues of all the agents corresponding to the obtained key information (hereafter, referred to as "$T_s$"). It does not include the time for the agents to process the message.
(7) The estimated value of the processing time, as to the agent in the cache, from determining execution of the message process until completion of the processing by the agents (hereafter, referred to as "$t_{in}$").
(8) The estimated value of the processing time, as to the agent not read into the cache, from determining the execution of the message process until reading the data on the agents from the DB and completing the processing by the agents (hereafter, referred to as "$t_{out}$").

On receiving the message, the message delivery mechanism in the agent server determines the type of agents to which it should be delivered. Next, it determines the agents to which it should be delivered by referring to the subscription information on the agents. In this step, the message delivery mechanism obtains the list of the key information on the agents. In this case, the message delivery mechanism calls the delivery method determination mechanism immediately before obtaining the list of the key information on the agents. The delivery method determination mechanism which is called refers to the attribute information on the received message and type information on the agents to which it should be delivered, obtains the information from the above (3) to (8), and calculates the costs of both the KeyOnly delivery method and SwapIn delivery method so as to select one of the methods based on the obtained cost values.

A description will be given as to the method of obtaining the above eight pieces of information in the example of implementation and cost calculation of the KeyOnly delivery mechanism or SwapIn delivery mechanism. To begin with, the method of obtaining the information indicated in the above (1) to (8) will be described.

(a1) Message attribute information: When determining the delivery method, a system designer or an administrator sets in advance which attribute information of the message is referred to.
(a2) The type of agents to which it should be delivered: Specified by the application program when delivering the message.
(a3) The value of the last time is recorded and used as the estimated value.
(a4) The value of the last time is recorded and used as the estimated value.
(a5) $T_k$: A linear equation in which N is a variable is acquired from the value measured before starting system operation, and the estimated value of N is acquired by assigning it to the linear equation.
(a6) $T_s$: The linear equation in which N is a variable is acquired from the value measured before starting the system operation, and the estimated value of N is acquired by assigning it to the linear equation.
(a7) $t_{in}$: The value measured before starting the system operation is used as the estimated value.
(a8) $t_{out}$: The value measured before starting the system operation is used as the estimated value.

Here, the values from (a3) to (a8) are stored as to each set of the message attribute information set in (a1) and the agent type information used in (a2). As the values of the last time are used as the values of N and R, the estimated values do not exist the very first time. In such a case, either the KeyOnly delivery mechanism or SwapIn delivery mechanism is determined without the cost calculation. It does not matter whichever it is.

Next, examples of cost formulas of the KeyOnly delivery mechanism and SwapIn delivery mechanism will be presented.

Cost of the KeyOnly delivery mechanism (hereafter, "$T_{Key}$")

$$T_{Key}=T_k+N\times R\times t_{in}+N\times(1-R)\times t_{out}$$

where, $T_k=a_k\times N+b_k$
$a_k$ and $b_k$ are acquired from the values measured before starting the system operation.

Cost of the SwapIn delivery mechanism (hereafter, "$T_{Swap}$")

$$T_{Swap}=T_s+N\times t_{in}$$

However, $T_s=a_s\times N+b_s$
$a_s$ and $b_s$ are acquired from the values measured before starting the system operation.

The delivery method determination mechanism selects the delivery mechanism of a smaller value of the calculated $T_{Key}$ and $T_{Swap}$. Here, there are the cases where, if the system is operated for a long period of time, $a_k$, $b_k$, $a_s$ and $b_s$ become significantly different from the values measured before starting the system operation. Therefore, the delivery method determination mechanism measures actual values corresponding to $T_k$ and $T_s$ on execution, and corrects the values of $a_k$, $b_k$, $a_s$ and $b_s$ if necessary. However, some errors are inherent in measured values, and so they are not sequentially corrected but are corrected in the case where the estimated values and the measured values are significantly different (50 percent for instance, which threshold is set by the administrator) all the time. As for the measured values, only the values in the case where no other message process is performed in parallel are used. It is because, otherwise, the values obtained by measurement will include CPU time required for processing other messages. The message delivery mechanism completely grasps which message is currently being processed for delivery, and so it can easily determine whether or not a plurality of messages are being processed in parallel. While various methods of performing a correction are thinkable, there is an easy method of recalculating the values of $a_k$ and $a_s$ assuming that the values of $b_k$ and $b_s$ remain unchanged.

Second Embodiment

According to a second embodiment, in order to reduce the time required for the entire delivery process, the delivery messages related to each piece of the delivery cause information is delivered, as to the acceptance of a plurality of pieces of the delivery cause information, according to predetermined delivery priorities while reducing the number of times of reading from the persistent storage to the cache memory. Before concretely describing the configuration of the second embodiment, the background for understanding the meaning of the second embodiment will be described.

Of the applications which are the subjects of the agent server, some of them require priorities for processing. As for the system for processing the messages, in general, the priorities are given to the messages and when obtaining the messages to be processed from the queue storing them, those of high priorities are obtained first. The agent server allocates the message queue to each agent as previously mentioned. If the messages are stored in order of the priorities in the message queue of a certain agent, the messages of high priorities are processed first as to that agent alone. To see the entire agent server, however, there are the cases where the threads are allocated to the agents having the messages of low priorities first. In the case where, in order to improve the performance the agent server, the threads are allocated to the agents in the agent cache first, it happens that, if there is in the agent cache, no agent having the messages of high priorities in the message queue and there is in the agent cache, the agent having the messages of lower priorities in the message queue, the threads are allocated to the latter agent first.

Furthermore, as a problem related to another kind of priorities, there is a problem specific to the agent server. Here, consideration is given to a system for performing the stock price notification service, which supports gold members and normal members. If the stock prices are renewed, the agent server performs the FanOut of the message. This is to deliver one message to a plurality of agents. Here, it is not unusual to think that the gold members should be notified of the stock prices in preference. However, an existing agent server is not able to realize it. The existing agent server determines thread allocation for the agents just by seeing the state of the agent cache. Therefore, in the case where the normal members happen to be on the agent cache, they are processed first and notified first. As for this problem, it is insufficient to merely give the priorities to the messages. It is because one message is delivered to a plurality of agents in the case of the FanOut. Therefore, the scheduling wherein the agents themselves are given the priorities and consideration is given thereto is necessary.

A solution to it according to the second embodiment is as follows. While it is arbitrary as to how to give the priority to the agent, the priority given to the agent is given to the type of the agent (hereafter, referred to as an "agent type priority") according to the second embodiment, where all the agents belonging to a certain type are given that priority. It is free, considering the priorities of the messages and the priorities of the agents, as to in what order the threads are allocated to the agents, that is, how to give the priorities to the agents on execution. Thus, according to the second embodiment, the priority of the agent on execution (hereafter, referred to as "agent execution priority") is a simple additional value of the largest priority value of the messages in the message queue and the agent type priority value. The priorities of the messages are 2, 1 and 0 (2 is the highest), and the agent type priorities are 1 and 0 (1 is the highest). Thus, the agent execution priorities are four stages of 3, 2, 1 and 0. The agent execution priority is a value dynamically changing according to the priorities of arriving messages.

As an example different form the message priority (the message priority is equivalent to the priority related to the contents themselves of the delivery message) and the agent type priority (the agent type priority is equivalent to the rating of the delivery destination by the delivery source) according to the second embodiment, the message priorities may also be 5, 4 and 0 (5 is the highest) and the agent type priorities may be 10 and 0 (10 is the highest), and it is possible to arbitrarily set the differences among the message priorities, among the agent type priorities and among the message priorities and agent type priorities.

According to the second embodiment, once the thread is allocated to a certain agent, the messages in the message queue of the agent are continuously processed. However, the thread is allocated to another agent in the case where there are remaining messages after a certain number of messages are continuously processed. While this method does not lead to the scheduling having the message priorities exactly reflected thereon, it is thereby possible, by continuously processing a certain agent, to reduce the cost required for switching the agents so as to improve the performance of the entire system.

[Data Structure]

To implement this, it is necessary to hold the management information on each agent. Here, a ControlBlock (control block) is defined as the object for managing it. The agent queue is also managed by the ControlBlock. It is possible, by specifying the key information on the agent, to obtain the ControlBlock of the agent. Furthermore, the ControlBlock is linkable since it has a bidirectional link structure. It is because it is linked based on FirstInFirstOut (FIFO) in the agent cache. Because of this structure, it is possible to identify the applicable ControlBlock by specifying the key to the agent so as to put the message in the message queue. There is an agent type name in the ControlBlock. Furthermore, there is the data for managing the agent type and the agent type priority.

Figure 21:
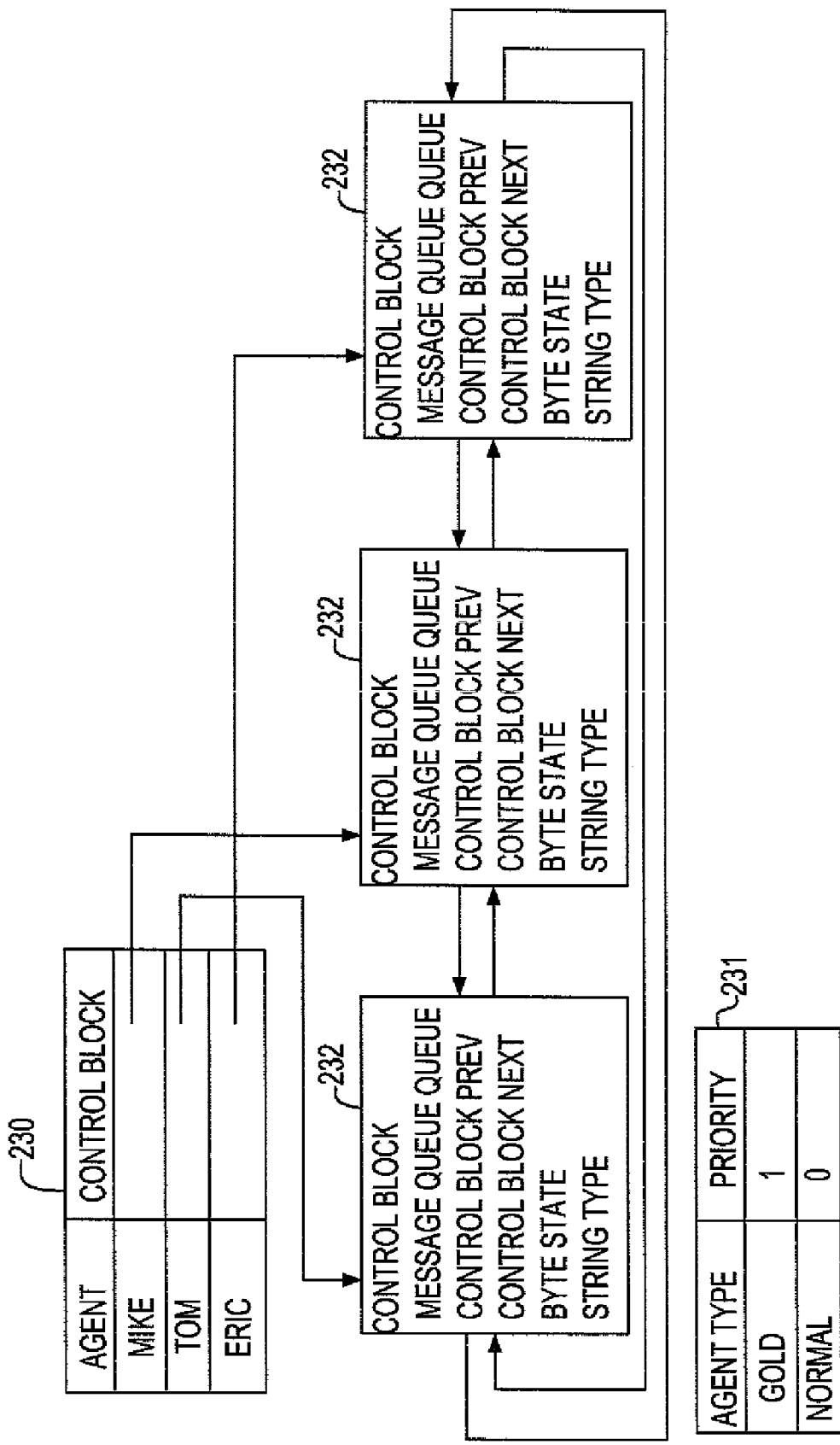
FIG. 21 is a diagram showing a data structure of a control block.

FIG. 21 shows a data structure of the control block. A first subject table 230 has the agent key (AgentKey) and the control block (ControlBlock) which are 1:1 recorded therein. The agent key is intended to identify the agent, and corresponds to each delivery destination at 1:1. In the first subject table 230 in FIG. 21, the agent keys are represented by personal names (Mike, Tom and Eric). A second subject table 231 has the correspondence of the agent type (AgentType) to the priority (Priority) recorded therein. In this example, there are two agent types of Gold and Normal, and the priorities 1 and 0 are set to the Gold and Normal respectively. As previously mentioned, it is also possible to widen the difference by setting the priorities of the gold members and normal members at 5 and 0 respectively, for instance. Each control block 232 includes the data on the message queue associated with it (MessageQueue queue), data on the preceding control block 232 linked to it (ControlBlock prev), data on the subsequent control block 232 linked to it (ControlBlock next), data representing the current state of it (byte state, such as IN_FILLED and IN_EMPTY mentioned later) and data on a string type (String type).

Figure 23:
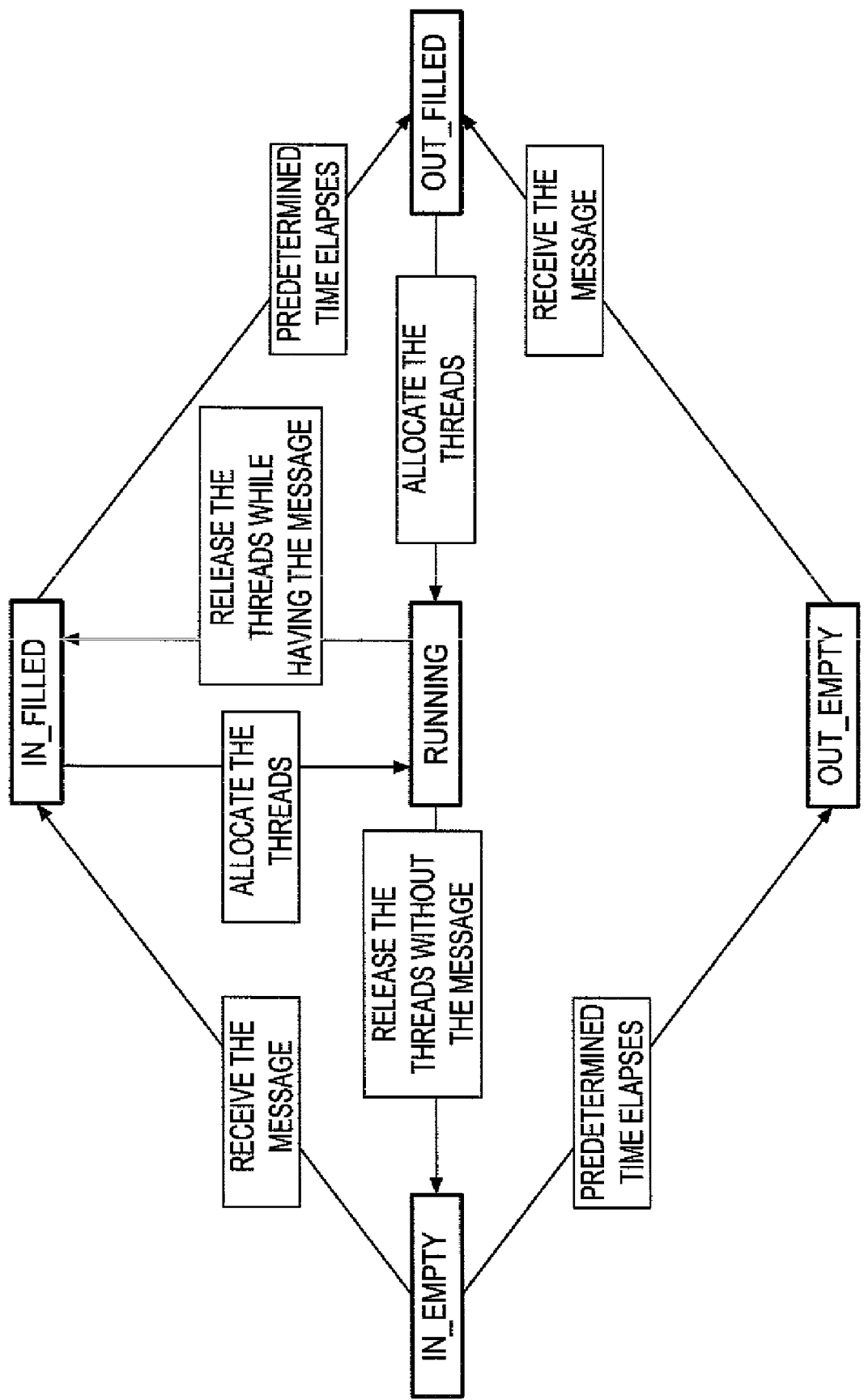
FIG. 23 is a state transition diagram of the control block.

The ControlBlock has a variable for representing the state of the agent. The values of the variable are RUNNING, IN_FILLED, IN_EMPTY, OUT_FILLED and OUT_EMPTY. FIG. 22 is a table showing the meanings of the variable values. FIG. 23 is a state transition diagram of the control block.

Figure 24:
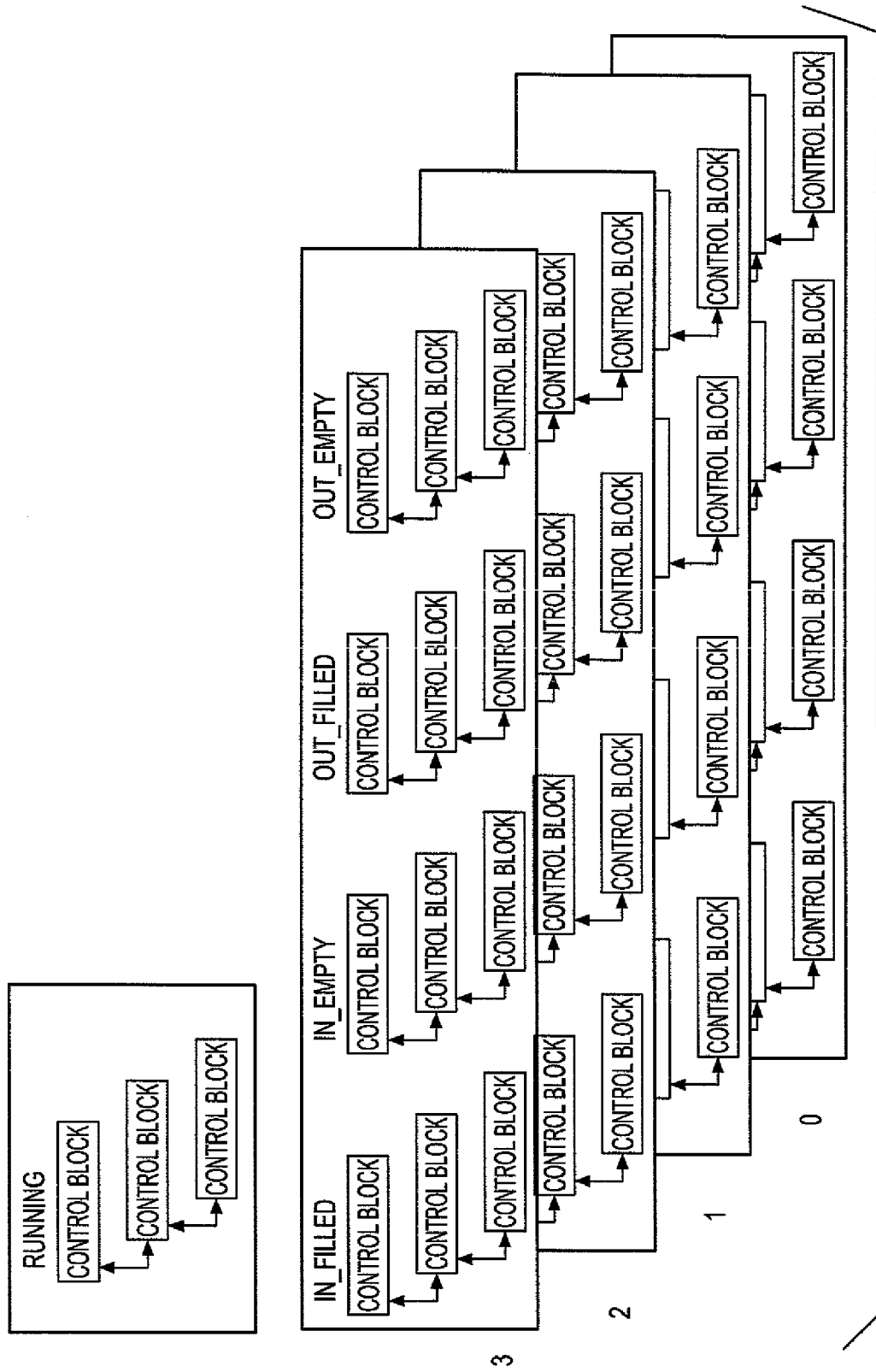
FIG. 24 shows the state in which the agents are grouped by the execution priorities thereof.

The ControlBlocks are grouped by the agent execution priority. Furthermore, they are grouped based on the state of the agent in each group. This grouping is realized by using the aforementioned link structure to link the ControlBlocks in the same group based on the FIFO. However, the ControlBlocks in the RUNNING state are linked as a link different from these groups. FIG. 24 shows the state in which the agents are grouped by the execution priorities thereof.

The following procedure is used to put the message in the message queue of a certain ControlBlock.

Put the message in the ControlBlock so that the messages get lined up in descending priority. In the case where there is a message of the same priority, put it in behind that message.

Finish it in the case where the inserted message is not at the head of the message queue.

Update the state of the agent based on the state transition diagram in FIG. 23.

Acquire the agent execution priority by adding the agent type priority to the message priority, and link the ControlBlock to the tail end of the list according to that value and the state of the agent.

If there is a thread in a wait state, restart it.

A schedule for the thread allocation is as follows. It shows a function getNextControlBlock, that is, the process of determining the ControlBlock of the agent to which the thread is allocated by using the data structure shown in FIG. 24. Although the function is a term of C language, the process can also be described by using OOP language such as Java® (registered trademark).

ControlBlock getNextControlBlock ( ) {

Step 1: Set a group of which agent execution priority is 3 as the group to be processed.

Step 2: If the list of IN_FILLED is not empty, return after obtaining the ControlBlock at the head of it. If empty, go to step 3.

Step 3: If the list of OUT_FILLED is not empty, return after obtaining the ControlBlock at the head of it. If empty, go to step 4.

Step 4: If the group to be processed is a group of which agent execution priority is 0, return as NULL. If not, set the group to be processed at the agent execution priority lower by one and go to step 2.

The thread continuously takes the messages out of the message queue of the agent once allocated so as to process the same agent. In the case where, as for this continuous process, the message queue becomes empty or the number of the continuously processed messages exceeds a certain limit value, it regards the process of that agent as completed and processes another agent.

The following procedure is used to complete processing the ControlBlock of the agent and obtain the ControlBlock of the agent to be processed next.

Step 1: Update the state of the ControlBlock of the agent of which process was completed based on the state transition diagram in FIG. 23.

Step 2: Acquire the agent execution priority by adding the message priority of the message at the head of the message queue (it is 0 if empty) to the agent type priority of the agent, and link the ControlBlock to the tail end of the corresponding list according to that value and the state of the agent.

Step 3: Call the function getNextControlBlock and obtain the next ControlBlock. In the case where the return value is NULL, put the thread in the wait state.

Step 4: Put the obtained ControlBlock in the state of RUNNING and link it to the tail end of the corresponding list.

Step 5: In the case where there is no applicable agent in the agent cache, call a function loadAgent by using the ControlBlock of the applicable agent as the argument, and place the read agent in the agent cache.

Step 6: Obtain the message at the head of the message queue, and call the message handler of the agent.

In the case where the thread in a wait state for the sake of inserting the message into the message queue is restarted, the steps 1 and 2 of the above process are skipped and the process of the steps 3 and 4 is performed.

Abandonment of the agent from the agent cache will be described. When reading a certain agent into the agent cache, it is necessary to simultaneously abandon a certain agent in the agent cache. The procedure of a function getEvictedAgent for determining the agent to be abandoned is as follows.

```
ControlBlock getEvictedAgent ( ) {
Step 1: Start with a group of which agent execution priority is 0.
Step 2: If the list of IN_EMPTY is not empty, update the state of the
ControlBlock at the head of it based on the state transition diagram in FIG.
23 and return the ControlBlock.
Step 3: If the agent execution priority is 3, go to step 4. If not, set the
agent execution priority higher by one and go to step 2.
Step 4: Start with a group of which agent execution priority is 0.
Step 5: If the list of IN_FILLED is not empty, update the state of the
ControlBlock at the tail end of it based on the state transition diagram in
FIG. 23 and return the ControlBlock.
Step 6: If the agent execution priority is 3, go to step 7. If not, set the
agent execution priority higher by one and go to step 5.
Step 7: Return NULL.
}
```

The procedure of a function loadAgent for reading the agent into the agent cache is as follows.

```
void loadAgent (Object pkey) {
Step 1: In the case where the agent cache can afford it, read a subject
agent specified by pkey, register it with the agent cache, and update the
state of the ControlBlock based on the state transition diagram in FIG. 23
to finish it.
Step 2: Call the function getEvictedAgent and obtain the ControlBlock of
the agent to be swapped out.
Step 3: In the case where the return value of the function getEvictedAgent
is NULL, finish it as a system error.
Step 4: Link the ControlBlock of the return value of the function
getEvictedAgent to the tail end of the list corresponding to that state.
Step 5: Abandon the agent corresponding to the ControlBlock of the return
value of the function getEvictedAgent from the agent cache.
Step 6: Read the subject agent, register it with the agent cache, and update
the state of the ControlBlock based on the state transition diagram in FIG.
23 to finish it.
}
```

In the step 3, the state of none being abandonable from the agent cache indicates that all the agents in the agent cache have the threads allocated thereto and are in the RUNNING state. The agent server is constituted so that the size of the agent cache is much larger than the number of threads. Therefore, there is no problem in handling it as a system error.

Third Embodiment

Before concretely describing the configuration of the third embodiment, the background for understanding the meaning of the third embodiment will be described.

The agent server has the messages delivered thereto from the outside. For instance, a client program puts the messages into the queues of MQSeries and JMS. The agent server receives the messages from these queues, identifies the agents to be the destinations, and puts them into the message queues thereof. The messages sent from the outside may be successively sent. There are the cases where, as to these messages, the order has a very important meaning. For instance, the message having the latest stock price is assumed. It is assumed that the IBM's stock price is $100 at a certain time and rises to $110 at the next moment. Here, if the messages for notifying these arrive at the agent in reverse, they indicate that the stock price dropped from $110 to $100. Thus, it is important to have the messages processed by each agent in the as-is order of arrival at the agent server.

The agent server has the condition of the message to be received by each agent registered with the table of the database (subscription table) in advance by each agent. The message delivery mechanism issues the SQL to this subscription table and obtains the list of destination agents so as to put the message into the message queues of the applicable agents. Thereafter, the execution environment of the agent server allocates the thread to the agents in adequate timing so as to have the message processed.

Here, the easiest method for having the messages processed by the agents in the as-is order of arrival thereof is to provide only one thread for receiving the messages from the outside and delivering the messages to the agents. Thus, it is possible to put the message into the message queues of the agents in order of reception without fail. However, this method does not allow parallel processing so that a throughput of the message delivery process is consequently reduced. The message delivery mechanism accesses the database. The message delivery mechanism of the agent server completely stops until the results are returned from the database.

Thus, it is possible to allocate a plurality of threads to the message delivery mechanism and have the message receiving process and message delivery process performed by each thread so as to simultaneously perform the delivery process of a plurality of messages in parallel. The database can also be accessed in parallel so that improvement in the throughput can be expected. According to this method, however, it becomes unclear as to which of the thread for processing the message received first and the thread for processing the message received next puts the message into the message queues of the agents earlier. The message is determined by the information held by that message and the search results of the subscription table. For that reason, the agents as the destinations are different for each message so that there are the cases where the number of destination agents is 100,000 for a certain message and the number is 100 for the message immediately after it. In such a situation, a reversal can easily occur as to the order of the messages to be put into the message queue of a certain agent.

Figure 25:
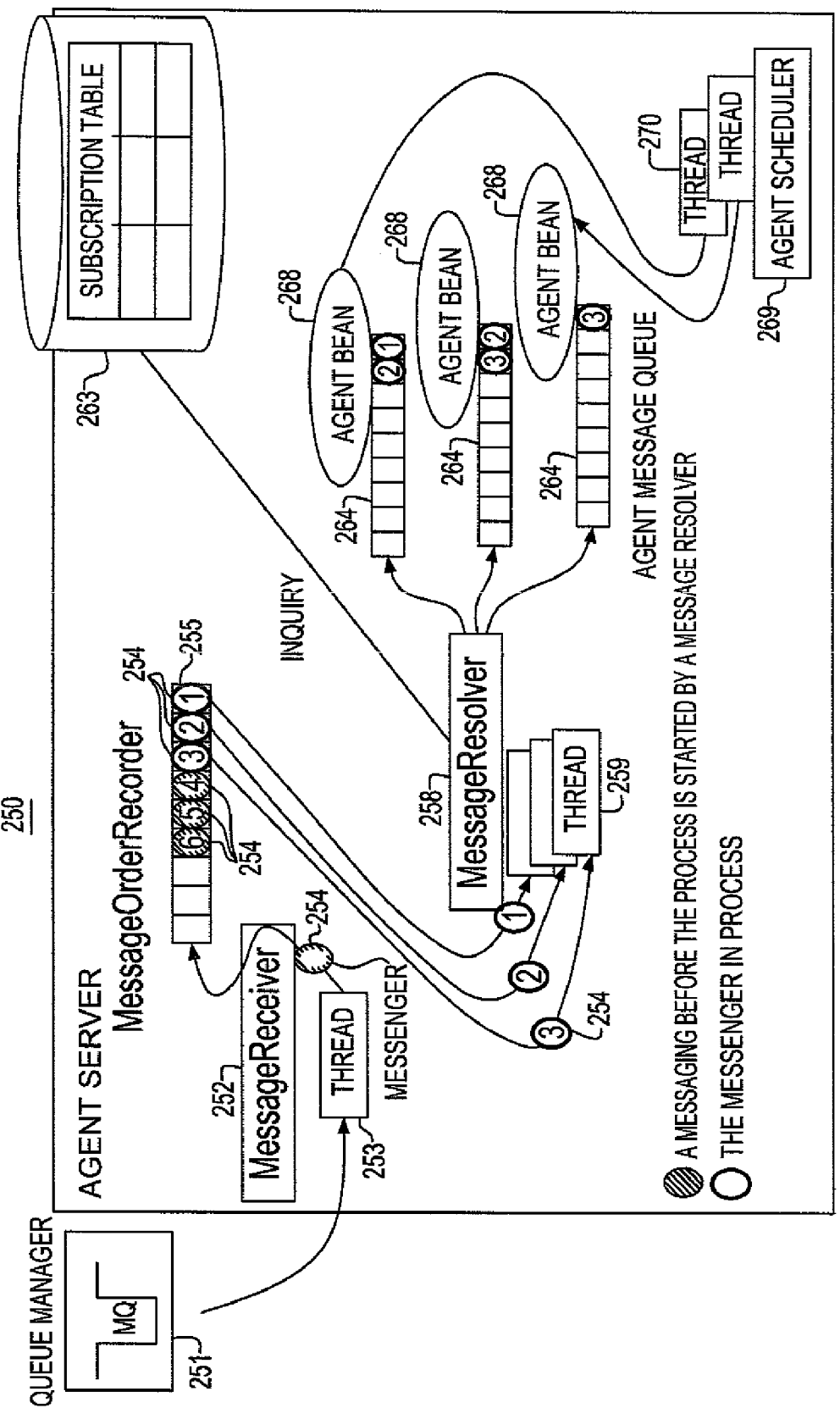
FIG. 25 is a block diagram of the agent server for ensuring that the delivery messages related to the delivery cause information are delivered to the delivery destinations in the order of acceptance of the delivery cause information.

According to the third embodiment, it is ensured that the delivery messages related to the delivery cause information are delivered to the delivery destinations in the order of acceptance of the delivery cause information. FIG. 25 is a block diagram of the agent server for ensuring that the delivery messages related to the delivery cause information are delivered to the delivery destinations in the order of acceptance of the delivery cause information. The elements denoted by reference numerals are as follows.

250: Agent server related to the third embodiment
251: Queue manager (QueueManager)
252: Message receiver (MessageReceiver)
253: Threads used by the message receiver 252
254: Messenger
255: Message order recorder (MessageOrderRecorder)
258: Message resolver
259: Threads used by the message resolver 258
263: Subscription table
264: Agent message queue
268: Agent bean
269: Agent scheduler
270: Threads used by the agent scheduler 269

The QueueManager is the mechanism for storing the messages existing outside the agent server and delivering them to the agent server. A component for receiving the messages delivered by the QueueManager is the MessageReceiver. It is operated by one thread, and generates a Messenger object if it receives the message so as to set the received message on that object. Furthermore, it sets sequence numbers. Thereafter, it passes the Messenger object to the MessageOrderRecorder.

Here, the Messenger object is the object for holding the object of the message from the outside and also keeping the state in the table in FIG. 26, and the Messenger object is put into the message queues of the agents. FIG. 26 is a table explaining the processing states of the Messenger object.

The MessageOrderRecorder is the component for recording the Messenger objects in the as-is order. The MessageOrderRecorder sorts and records them in increasing order of the sequence numbers by putting them in a "NotProcessed" state. The MessageReceiver sets the Messenger object on the MessageOrderRecorder, and then calls the MessageResolver to make a request for the process of the Messenger object.

The MessageResolver having received this request obtains an idling thread from a thread group managed by it, and wakes it. In this case, if there is no idling thread (to be more specific, all the threads are being processed), it does nothing. The thread of the MessageResolver obtains an unprocessed Messenger object from the MessageOrderRecorder. In this case, the MessageOrderRecorder selects the Messenger object of which state is "Not processed" and sequence number is the smallest, and sets the Messenger object in a "Distributing" state which means being processed. The MessageOrderRecorder must see to it that these processes are not concurrently performed. This thread calls the MessageResolver, and requests it to process the obtained Messenger object.

The called MessageResolver searches the subscription table in the database, and obtains a set of the agent keys of the agent to which the message should be passed. Next, it puts the Messenger objects into the message queues of the agents corresponding to the agent keys. If the Messenger objects are completely inserted into the message queues of all the destination agents, it calls the MessageOrderRecorder to inform it of the completion of the insertion process of the Messenger objects. When putting the Messenger objects into the message queues, it refers to the sequence numbers of the Messenger objects so as to put them in increasing order of their values.

The MessageOrderRecorder refers to the sequence number of the Messenger object, and in the case where there is the Messenger object of a smaller number than that, it puts the Messenger object in a "Distributed" state. In the case where there is no such Messenger object, it puts the Messenger object in a "Ready" state, and simultaneously erases the record of the Messenger object from the MessageOrderRecorder. Furthermore, it refers to the state of the Messenger object of which sequence number is the sequence number of that Messenger object plus 1. If it is "Distributed," it puts the Messenger object in the "Ready" state, and simultaneously erases the record of the Messenger object from the MessageOrderRecorder. It repeats the same process until it meets the Messenger object which is in a "Distributing" state. If it finally meets the Messenger object which is in a "Distributing" state, it puts the Messenger object in the "Ready" state. The MessageOrderRecorder must see to it that these processes are not concurrently performed.

The AgentScheduler allocates the thread according to the state of the message queue of each agent. If the state of the Messenger object at the head of the message queue is "Ready," the AgentScheduler allocates the thread to the agent corresponding to that message queue. If not, it checks the other agents. The procedures of the components are as follows.

[Receiving Process of the MessageReceiver]
1: Receive the message.
2: Generate the Messenger object and set the message.
3: Set he sequence number to the Messenger object.
4: Call the recording process of the MessageOrderRecorder by using the Messenger object as the argument.
5: If there is the idling thread in the thread group for the MessageResolver, restart it.

[Recording process of the MessageOrderRecorder]
1: Sort and record the received Messenger objects in increasing order of the sequence numbers by putting them in the "NotProcessed" state.

[Obtaining process of the MessageOrderRecorder]
1: Of the recorded Messenger objects of which state is "Not processed," obtain the Messenger object of which sequence number is the smallest.
2. If the object has the smallest sequence number of all the Messenger objects currently recorded, put it in the "Ready" state. If not, put it in the "Distributing" state.
3. Return that Messenger object.

[Insertion Completion Process of the MessageOrderRecorder]
1: In the case where a Messenger object having a smaller sequence number than that of the passed Messenger object is recorded, put the passed Messenger object in the "Distributed" state and get out of the process.
2: Put the passed Messenger object in the "Ready" state, and erase it from the record.
3: Set the Messenger object recorded next to the passed Messenger object as a subject Messenger object.
4: If the subject Messenger object is in the "Distributing" state, get out of the process.
5: In the case where the subject Messenger object is in the "Distributed" state, put the subject Messenger object in the "Ready" state.
6: Erase the subject Messenger object from the record.
7: Set the Messenger object next to the current subject Messenger object as the subject Messenger object, and return to the step 4.

[Message Insertion Process of the MessageResolver]
1: Call the obtaining process of the MessageOrderRecorder, and obtain the Messenger object to be processed. If there is none, get out of the process.

2: Search the subscription table by referring to the data on the message of the obtained Messenger object so as to obtain the list of the agent keys of the agents to which the message should be passed.
3: For all the agent keys in the obtained list, insert the Messenger object into the message queue of the agent corresponding to each individual agent key. In this case, if there are already the Messenger objects in the message queue, insert it so that they are sorted in increasing order of the sequence numbers thereof.
4: Call the insertion completion process of the MessageOrderRecorder by using the Messenger object as the argument.

[Thread Allocation Process of the AgentScheduler]
1: Select the agent of which message queue is not empty from the list of the agents managed by the agent server.
2: If the Messenger object at the head of the message queue of the agent is in the "Ready" state, obtain the message from the Messenger object and call the message handler of the agent. If not, return to the step 1.
3: Repeat the step 2 until the message queue becomes empty or it meets the Messenger object which is not in the "Ready" state.
4: Return to the step 1.

Fourth Embodiment

An embodiment of the present invention in a cybermall system dealing in personal computer related products will be presented. According to this embodiment, in the case where the total amount of a plurality of goods is within the amount set by the user, the information is delivered to the user by e-mail. Although the e-mail is finally delivered to the user according to this embodiment, the agent performs the process without delivering the e-mail on the way.

One day, Mr. Tanaka tried to purchase one personal computer having a CPU of 600 MHz or more mounted thereon, two extended memories of 128 MB and one color printer for the total amount of 100,000 yen or less. However, he only found the personal computer at 80,000 yen, memories of 128 MB at 10,000 yen per piece and color printer at 18,000 yen. As they exceed the budget, he inputted a message to the system to the effect that he should be informed by e-mail if a combination of the products of which total amount is 100,000 or less is found. Two days later, a personal computer B-600 of Beta Company having a CPU of 600 MHz at 70,000 yen was registered with this cybermall, and the color printer of Edison Company at 10,000 yen was registered the following day. Thus, the total amount of the personal computer B-600 of Beta, the color printer of Edison and two 128-MB memories at 10,000 yen per piece is 100,000, and so the e-mail reading as "the total amount of the personal computer B-600 of Beta, two 128-MB memories and color printer of Edison is 100, 000" was sent to Mr. Tanaka.

The following process is performed inside this system. Mr. Tanaka inputs a condition to the agent for him in the cybermall system from a Web browser to the effect that "a notice should be given by e-mail in the case where the combination of the products consisting of the personal computer of 600 MHz or more, two 128-MB memories and color printer of which total amount is 100,000 yen or less is found." Then, this agent obtains the information on personal computers, memories and printers from a product information DB. In this case, the agent for Mr. Tanaka obtains the information on the "personal computer at 80,000 yen," "128-MB memories at 10,000 yen per piece" and "color printer at 18,000 yen," and the information is held as the data by the agent. Concurrently with it, the information on the "personal computers," "memories" and "color printers" is registered as subscription information. Two days later, the information on the personal computer of Beta at 70,000 yen is inputted to the product information DB. Concurrently with it, an event notifying that the information on the personal computer was updated is sent to the system. Then, this event is converted into the message called a new product message of the information on "the personal computer B-600 of Beta having the CPU of 600 MHz at 70,000 yen" by a message mechanism of the agent server, and is inserted into all the message queues of the related agents. As the agent for Mr. Tanaka is related to this message, this message is also inserted into the message queue of that agent. Thereafter, the message handler of the agent for Mr. Tanaka is called, and this message is passed as the argument thereof. The agent for Mr. Tanaka having received it calculates the total amount including the "128-MB memories at 10,000 yen per piece and "color printer at 18,000 yen." However, the total amount is 108,000 yen which is still exceeding 100,000 yen, and so the e-mail is not sent yet. Instead, "the personal computer B-600 of Beta having the CPU of 600 MHz at 70,000 yen" is added to a product data list held by the agent for Mr. Tanaka. Three days later, the event of the information on "the color printer of Edison at 10,000 yen" is sent to the agent by the same method. At this time, the message handler of the agent for Mr. Tanaka is called, and the message of the information on "the color printer of Edison at 10,000 yen" is passed as the argument. Here, the total amount of the "personal computer B-600 of Beta, color printer of Edison and two 128-MB memories at 10,000 per piece" becomes 100,000 yen so that the agent for Mr. Tanaka sends to Mr. Tanaka the message reading as "the total amount of the personal computer B-600 of Beta, two 128-MB memories and color printer of Edison is 100,000 yen."

The point in this embodiment is that the e-mail is not sent when the agent for Mr. Tanaka processes the message of the information on "the personal computer B-600 of Beta having the CPU of 600 MHz at 70,000 yen" with the message handler. The process performed by the agent for Mr. Tanaka is as follows.

1.: To calculate the total amount of the memories and printer already held.
2.: To compare the total amount to the price of "100,000 yen."
3.: To consequently determine not to send the e-mail.
4.: To add "the personal computer B-600 of Beta having the CPU of 600 MHz at 70,000 yen" to the data.

Fifth Embodiment

In the fifth embodiment, a description will be given as to the cases where the process requester does not belong to a concept such as a person or a member of an organization. Consideration is given to an inter-corporate work flow system in which a company A receives orders for PC components from a plurality of companies. This system is the one wherein order systems of orderers (companies B and C in the example below) are linked up with an order-receiving system of the company A.

On September 20, the company B starts to process a request to "order 100 HDDs (hard disk drives) of a model number 1124 with a desired deadline of delivery on October 1 and a final deadline of delivery on October 3" by a purchase order number 0012. On the same day, the company C starts to process a request to "order 200 HDDs of a model number 1124 with a desired deadline of delivery on October 5 and a final deadline of delivery on October 10" by a purchase order number 0013.

Then, the work flow system of the company A starts an order number 0012 work flow process and an order number 0013 work flow process. Concurrently with it, the agent server of the company A generates an order number 0012 monitoring agent and an order number 0013 monitoring agent for monitoring the order number 0012 work flow process and order number 0013 work flow process. This agent server is linked up with the work flow system of the company A. The monitoring agents for monitoring the work flows perform the following monitoring.

1.: Whether or not the order work flow process is delayed in some processing.
2.: Whether or not the work flow process failed for some reason.
3.: Whether or not the work flow process must be cancelled for some reason.
4.: Whether or not the requesting company started the process of canceling the order process.

Here, it is assumed that, as of September 26, "although 500 HDDs of the model number 1124 were to be delivered to the company A from its subcontractor or affiliate such as a group company by September 29 according to the schedule, the 500 HDDs are now to be delivered on October 6 because of a delay in production of the HDDs of the model number 1124." In this case, the event representing this information is sent to the agent server. The agent server converts this event into the message reading as "although 500 HDDs of the model number 1124 were initially to be delivered to the company A by September 29 according to the schedule, the 500 HDDs are now to be delivered to the company A on October 6 because of a delay in production of the HDDs of the model number 1124," which message will be passed to all the monitoring agents for monitoring the order work flow of HDDs of the model number 1124. This message will also be passed to the order number 0012 monitoring agent and order number 0013 monitoring agent. Here, the message handler of the order number 0012 monitoring agent cancels the order number 0012 work flow process, and sends a notice message reading as "the order number 0012 was cancelled" to the system of the Company B. The order number 0013 monitoring agent lets the order number 0013 work flow continue as-is, but sends the message reading as "the deadline of delivery of the order number 0013 was changed to October 6 or thereafter" to the system of the Company C.

According to the fifth embodiment, the agent is not generated for the members but is generated for the "work flow process." In addition, it is a computer system rather than a "person" that is notified of the message of the agent. The work flow processing system of the company A exemplified by this embodiment generates a large amount of work flow procedures. On the other hand, the deadline of delivery and handled product and so on are all different in each individual work flow procedure. For that reason, in the case where the event occurred, such as "although 500 HDDs of the model number 1124 were initially to be delivered to the company A by September 29 according to the schedule, the 500 HDDs are now to be delivered to the company A on October 6 because of a delay in production of the HDDs of the model number 1124," how to process the event is different depending on each work flow procedure. Therefore, the method of generating the monitoring agent for each individual work flow procedure is thinkable. In this case, it is necessary for the system to handle a large amount of monitoring agents. In addition, the message processing of the large amount of agents is necessary as shown in the foregoing example.

Thus, according to the present invention, it is possible, by determining the process requestors to which the message generated due to the accepted agent activating event is applied based on the process requestor search information, to effectively control the reading of the agent associated with each process requestor from the persistent storage to the cache memory so as to realize the reduction in the processing time.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A message processing apparatus comprising:
   process requester search information management means for managing process requestor search information for searching for an applicable process requester of an agent activating event;
   acceptance means for accepting the agent activating event;
   process requestor determination means for determining a process requestor from which a message generated by said agent activating event based on said process requestor search information;
   a plurality of agents associated with the process requesters, stored in a persistent storage, readable from the persistent storage to a cache memory and abandonable from the cache memory, each agent becoming operable when existing in the cache memory;
   at least one sub-process priority determination means for determining process priority about each message as sub-process priority based on a single standard of value;
   compound process priority determination means for, when the total number of said sub-process priority determination means is two or more, determining compound process priority about each message based on the sub-process priority individually determined as to each message by each sub-process priority determination means, and when the total number of said sub-process priority determination means is one, determining as the compound process priority the sub-process priority determined by said one sub-process priority determination means as to each message;
   agent instruction means for rendering the message of the highest compound process priority among the messages held by each message queue as the message of the highest priority, and between the agents related to the message queues of which compound process priority of the message of the highest priority is the same, instructing the agent existing in the cache memory to operate in preference to the agent not existing therein
   list information creation means for, based on said process requestor search information, creating list information of process requestors from which a message generated by said agent activating event;
   insertion and reading means for, of the process requesters included in said list information, selecting a plurality of unselected process requesters as the process requestors to be inserted and read, inserting said message into the message queues related to the process requestors to be inserted and read and reading the agents related to said process requesters from the persistent storage to the cache memory, wherein said inserting and said reading are performed in parallel;
   repetitive instruction means for, in the case where the unselected process requester remains in said list information, waiting for termination of all the agents in operation and instructing said insertion and reading means to repeat process;
   a plurality of threads mutually operable in parallel, each thread detecting the process requesters to which the message generated due to said agent activating events based on said process requestor search information and inserting said message into the message queues related to the process requesters; and
   allocation means for allocating to each thread the agent activating event to be processed by the thread,
   wherein threads are allocated first to the agents having messages of low priorities.

2. The message processing apparatus according to claim 1, wherein each agent sends a notice to the process requestor associated with the agent as to the message in the message queue associated with the agent.

3. The message processing apparatus according to claim 1, further comprising:
   list information creation means for, based on said process requestor search information, creating list information of process requestors from which a message generated by said agent activating event;
   a first message queue processing mechanism;
   a second message queue processing mechanism; and
   selection means for selecting either one of the first and second message queue processing mechanisms,
   wherein:
   the first message queue processing mechanism has insertion means for inserting said message into the message queues related to all the process requesters included in said list information; and
   the second message queue processing mechanism has:
   insertion and reading means for, of the process requesters included in said list information, selecting a plurality of unselected process requesters as the process requestors to be inserted and read, inserting said message into the message queues related to the process requestors to be inserted and read and reading the agents related to said process requestors from the persistent storage to the cache memory; and
   repetitive instruction means for, in the case where the unselected process requester remains in said list information, waiting for termination of all the agents in operation and instructing said insertion and reading means to repeat the process.

4. The message processing apparatus according to claim 3, wherein selection of said selection means is based on an instruction of an operator.

5. The message processing apparatus according to claim 3, wherein selection of said selection means operates based on estimated number of the process requesters from which the message generated by the agent activating event, operates based on estimated hit rate in the cache memory where the agents resides, said agents associated with the process requesters from which the message generated by the agent activating event, in the case where said selection means selects the first message queue processing mechanism, the selection of said selection means operates based on estimated work time from acceptance of information by said acceptance means until obtaining the list information on the process requesters to which the message is applied and inserting the message into the message queues of all the agents, in the case where said selection means selects the second message queue processing mechanism, the selection of said selection means operates based on estimated work time from acceptance of information by said acceptance means until obtaining the list information on the process requesters to which the message is applied and inserting the message into the message queues of all the agents, the selection of said selection means operates based on estimated time from determining if the agent in the cache memory is used until completing a process by a determined agent, and/or the selection of said selection means operates based on estimated time from determining if the agent outside the cache memory is used until the process is completed by the determined agent.

6. The message processing apparatus according to claim 1, wherein said standard of value is related to one or more of: the contents of the message or the process requesters to which the message is applied.

7. The message processing apparatus according to claim 6, wherein the standard of value related to the contents of the message includes the standard of value related to an emergency of the message.

8. The message processing apparatus according to claim 6, wherein the standard of value related to the process requestors to which the message is applied includes the standard of value related to a rating of the process requestors.

9. The message processing apparatus according to claim 1, wherein, when there are a plurality of messages held by the message queue associated with the agent initiated by said agent instruction means, the agent continuously processes all those messages or the messages of which compound process priority is within a predetermined value in descending rank.

10. The message processing apparatus according to claim 1, wherein:
there is agent management means including said sub-process priority determination means and said compound process priority determination means;
said agent management means has existence detection means for detecting whether or not each agent exists in the persistent storage, grouping information management means for grouping the agents and managing grouping information based on results of the existence detection means and the compound process priority of each agent, and update instruction means for instructing the grouping information management means to update the grouping information; and
said agent instruction means instructs the agents to operate in order based on the grouping information of said agent management means.

11. The message processing apparatus according to claim 1, further comprising:
acceptance order information management means for managing acceptance order information on the agent activating events accepted by said acceptance means;
proceeding information management means for managing proceeding information of the thread associated with each agent activating event accepted by said acceptance means;
determination means for, associated with the agent activating event which indicates proceeding information is information on thread termination (hereafter, referred to as a "determined agent activating event"), determining whether or not, of the agent activating events accepted by said acceptance means prior to the determined agent activating event, there is any agent activating event which indicates a thread is unfinished; and
agent control means for controlling the agent associated with the message generated upon the determined agent activating event determined that there is an agent activating event which indicates a thread is unfinished.

12. The message processing apparatus according to claim 11, wherein said agent control means for allowing the agent associated with the message generated upon the determined agent activating event determined that there is no agent activating event which indicates a thread is unfinished.

13. The message processing apparatus according to claim 12, wherein said determination means for, in the case where the agent activating event immediately following the agent activating event determined that there is no agent activating event which indicates a thread is unfinished, in acceptance order is already determined that there is an agent activating event which indicates a thread is unfinished, changing a determination result from that there is an agent activating event which indicates a thread is unfinished to that there is no agent activating event which indicates a thread is unfinished.

14. The message processing apparatus according to claim 13, wherein said agent for, in the case of processing the message queue in which the messages generated due to a plurality of agent activating events whose determination result by said determination means is that there is no agent activating event which indicates a thread is unfinished, continuously processing the plurality of continuous messages.

15. A computer program product comprising a computer usable medium having computer readable program code means embodied therein for causing message processing, the computer readable program code means in said computer program product comprising computer readable program code means for causing a computer to effect the functions of claim 1.

16. The message processing apparatus according to claim 1, further comprising:
an agent server for processing said plurality of agents asynchronously, having said message queue of said each agent, managing said cache memory, and allocating threads to said agents on said cache memory.

17. A message processing method comprising:
a process requester search information management step of managing process requestor search information for searching for an applicable process requester of an agent activating event;
an acceptance step of accepting the agent activating event;
a process requestor determination step of determining a process requestor from which a message generated by said agent activating event based on said process requestor search information;
an agent setting step of setting a plurality of agents, the agents being associated with the process requesters, stored in a persistent storage, each agent being readable from the persistent storage to a cache memory and abandonable from the cache memory, and each agent operating only when existing in the cache memory to be able to process the message in a message queue corresponding to the agent;
at least one sub-process priority determination step of determining process priority about each message as sub-process priority based on a single standard of value;
a compound process priority determination step of, when the total number of said sub-process priority determination steps is two or more, determining compound process priority about each message based on the sub-process priority individually determined as to each message in each sub-process priority determination step, and when the total number of said sub-process priority determination steps is one, determining as the compound process priority the sub-process priority determined in said one sub-process priority determination step as to each message;
an agent instruction step of rendering the message of the highest compound process priority among the messages held by each message queue as the message of the highest priority, and between the agents related to the message queues of which compound process priority of the message of the highest priority is the same, instructing the agent existing in the cache memory to operate in preference to the agent not existing therein:

a list information creation step of, based on said process requestor search information, creating list information of process requesters from which a message generated by said agent activating event;

an insertion and reading step of, of the process requestors included in said list information, selecting a plurality of unselected process requesters as the process requesters to be inserted and read, inserting said message into the message queues related to the process requestors to be inserted and read, and reading the agents related to said process requestors from the persistent storage to the cache memory, wherein said inserting and said reading are performed in parallel;

a repetitive instruction step of, in the case where the unselected recess requester remains in said list information, waiting for termination of all the agents in operation and instructing said insertion and reading step to be repeated a thread setting step of setting a plurality of threads, the threads being mutually operable in parallel, detecting the process requestors to which the message generated due to the agent activating event based on said recess requestor search information and inserting said message into the message queues related to the process requestors;

an allocation step of allocating to each thread the agent activating event to be processed by the thread, wherein the threads are allocated first to the agents having messages of low priorities.

18. The message processing method according to claim 17, wherein each agent sends a notice to the process requestor associated with the agent as to the message in the message queue associated with the agent.

19. The message processing method according to claim 17, further comprising:

a list information creation step of, based on said process requester search information, creating list information of process requestors from which a message generated by said agent activating event;

a first message queue processing step;

a second message queue processing step; and a selection step of selecting either one of the first and second message queue processing steps;

wherein:

the first message queue processing step has an insertion step of inserting said message into the message queues related to all the process requestors included in said list information; and the second message queue processing step has:

an insertion and reading step of, of the process requesters included in said list information, selecting a plurality of unselected process requesters as the process requestors to be inserted and read, inserting said message into the message queues related to the process requesters to be inserted and read and reading the agents related to said process requesters from the persistent storage to the cache memory; and a repetitive instruction step of, in the case where the unselected process requester remains in said list information, waiting for termination of all the agents in operation and instructing said insertion and reading step to be repeated.

20. The message processing method according to claim 19, wherein the selection in said selection step is based on an instruction of an operator.

21. The message processing method according to claim 19, wherein the selection in said selection step operates based on estimated number of the process requesters from which the message generated by the agent activating event, operates based on estimated hit rate in the cache memory where the agents resides, said agents associated with the process requesters from which the message generated by the agent activating event, in the case where the process is allocated in the first message queue processing step, the selection in said selection step operates based on estimated work time from acceptance of information in said acceptance step until obtaining the list information on the process requestors to which the message is applied and inserting the message into the message queues of all the agents, in the case where the process is allocated in the second message queue processing step, the selection in said selection step operates based on estimated work time from acceptance of information in said acceptance step until obtaining the list information on the process requesters to which the message is applied and inserting the message into the message queues of all the agents, the selection in said selection step operates based on estimated time from determining if the agent in the cache memory is used until completing a process by a determined agent, and/or the selection in said selection step operates based on estimated time from determining if the agent outside the cache memory is used until the process is completed by the determined agent.

22. The message processing method according to claim 17, wherein said message standard of value is related to one or more of: the contents of the message or the process requesters to which the message is applied.

23. The message processing method according to claim 22, wherein the standard of value related to the contents of the message includes the standard of value related to an emergency of the message.

24. The message processing method according to claim 22, wherein the standard of value related to the process requestors to which the message is applied includes the standard of value related to a rating of the process requesters.

25. The message processing method according to claim 17, wherein, when there are a plurality of messages held by the message queue associated with the agent initiated in said agent instruction step, the agent continuously processes all those messages or the messages of which compound process priority is within a predetermined value in descending rank.

26. The message processing method according to claim 17, further comprising:

an agent management step including said sub-process priority determination step and said compound process priority determination step;

said agent management step having an existence detection step for detecting whether or not each agent exists in the persistent storage, and grouping information management step of grouping the agents, managing grouping information and updating the grouping information as appropriate based on results of the existence detection step and the compound process priority of each agent; and said agent instruction step for instructing the agents to operate in order based on the grouping information in said agent management step.

27. The message processing method according to claim 17, further comprising:

an acceptance order information management step of managing acceptance order information on the agent activating events accepted by said acceptance step;

a proceeding information management step of managing proceeding information of each thread associated with each agent activating event accepted by said acceptance step;

a determination step of, associated with the agent activating event which indicates proceeding information is information on thread termination (hereafter, referred to as a "determined agent activating event"), determining whether or not, of the agent activating events accepted in said acceptance step prior to the determined agent activating event, there is any agent activating event of which thread process is unfinished; and an agent control step of controlling the agent associated with the message generated upon the determined agent activating event determined that there is an agent activating event which indicates a thread is unfinished.

28. The message processing method according to claim 27, wherein said agent control step of allowing the agent associated with the message generated upon the determined agent activating event determined that there is no agent activating event which indicates a thread is unfinished.

29. The message processing method according to claim 27, wherein said determination step of, in the case where the agent activating event immediately following the agent activating event determined that there is no agent activating event which indicates a thread is unfinished, in acceptance order is already determined that there is an agent activating event which indicates a thread is unfinished, changing the determination result from that there is an agent activating event which indicates a thread is unfinished to that there is no agent activating event which indicates a thread is unfinished.

30. The message processing method according to claim 29, wherein said agent setting step of, in the case of causing the agent to process the message queue in which the messages generated due to a plurality of agent activating events whose determination result by said determination step is that there is no agent activating event which indicates a thread is unfinished, setting said agent to continuously process the plurality of continuous messages.

31. A program storage device readable by machine, tangibly embodying a program of instructions executable by the machine to perform method steps for message processing, said method steps comprising the steps of claim 17.

32. A message processing method according to claim 17, further comprising:

provising an agent server to process said plurality of agents asynchronously, to have said message queue of said each agent, to manage said cache memory, and to allocate threads to said agents on said cache memory.

* * * * *